(12) United States Patent
Hartman et al.

(10) Patent No.: US 9,304,821 B2
(45) Date of Patent: Apr. 5, 2016

(54) LOCATING FILE DATA FROM A MAPPING FILE

(71) Applicant: HITACHI DATA SYSTEMS ENGINEERING UK LIMITED, Bracknell, Berkshire (GB)

(72) Inventors: David Stephen Hartman, Santa Clara, CA (US); Thomas Andrew Glass, Santa Clara, CA (US); Shantanu Sinha, Santa Clara, CA (US); Ben Bernhard, Arlington, MA (US); Oleg Kiselev, Palo Alto, CA (US); James Mattly, Campbell, CA (US)

(73) Assignee: HITACHI DATA SYSTEMS ENGINEERING UK LIMITED, Berkshire (GB)

( * ) Notice: Subject to any disclaimer, the term of this patent is extended or adjusted under 35 U.S.C. 154(b) by 0 days.

(21) Appl. No.: 14/542,760

(22) Filed: Nov. 17, 2014

(65) Prior Publication Data

US 2015/0088882 A1   Mar. 26, 2015

Related U.S. Application Data

(63) Continuation of application No. 14/535,850, filed on Nov. 7, 2014, which is a continuation of application No. PCT/IB2013/001931, filed on Jun. 9, 2013.

(51) Int. Cl.
*G06F 9/46* (2006.01)
*G06F 15/16* (2006.01)
*G06F 15/173* (2006.01)
*G06F 9/50* (2006.01)
(Continued)

(52) U.S. Cl.
CPC .......... *G06F 9/5005* (2013.01); *G06F 9/45533* (2013.01); *G06F 9/4881* (2013.01); *G06F 9/50* (2013.01); *G06F 9/5027* (2013.01); *G06F 9/5038* (2013.01); *G06F 9/5072* (2013.01); *G06F 17/30091* (2013.01); *H04L 12/1881* (2013.01); *H04L 29/08* (2013.01); *H04L 29/08117* (2013.01); *H04L 29/08135* (2013.01); *H04L 41/0803* (2013.01); *H04L 61/2007* (2013.01); *H04L 67/1097* (2013.01)

(58) Field of Classification Search
None
See application file for complete search history.

(56) References Cited

U.S. PATENT DOCUMENTS 6,356,801 B1   3/2002   Goodman et al.
6,401,215 B1   6/2002   Maddalozzo, Jr. et al.
(Continued)

OTHER PUBLICATIONS

L. Lamport et al., "Paxos Made Simple", SIGACT News, Dec. 2001, pp. 51-58, vol. 32, No. 4.
(Continued)

*Primary Examiner* — Charles Swift
(74) *Attorney, Agent, or Firm* — Mattingly & Malur, P.C.

(57) ABSTRACT

In some examples, a distributed system may include a plurality of nodes with a file stored in a file system across the plurality of nodes. One of the nodes may receive a request for location data corresponding to a part of the file. For instance, the location data may be included in a mapping file, and the request may specify an offset of the mapping file. The mapping file may include locations of nodes storing parts of the file in the file system across the plurality of nodes, and the mapping file may have a plurality of parts corresponding to the parts of the file. In response to the request, the node may access the mapping file and send location data corresponding to the offset of the mapping file. The location data may indicate at least one of the nodes storing the part of the file.

26 Claims, 20 Drawing Sheets

(51) Int. Cl.

| | | |
|---|---|---|
| H04L 29/08 | (2006.01) | |
| G06F 9/48 | (2006.01) | |
| H04L 12/18 | (2006.01) | |
| G06F 17/30 | (2006.01) | |
| H04L 12/24 | (2006.01) | |
| G06F 9/455 | (2006.01) | |
| H04L 29/12 | (2006.01) | |

(56) References Cited

U.S. PATENT DOCUMENTS

| | | | |
|---|---|---|---|
| 6,907,507 B1 | 6/2005 | Kiselev et al. | |
| 6,910,098 B2 | 6/2005 | LeCrone et al. | |
| 6,910,111 B1 | 6/2005 | Colgrove et al. | |
| 6,978,354 B1 | 12/2005 | Kekre et al. | |
| 7,089,385 B1 | 8/2006 | Kiselev et al. | |
| 7,222,257 B1 | 5/2007 | Dibb | |
| 7,392,421 B1 | 6/2008 | Bloomstein et al. | |
| 7,617,259 B1 | 11/2009 | Muth et al. | |
| 7,805,407 B1 | 9/2010 | Verbeke et al. | |
| 8,401,997 B1 | 3/2013 | Tawri et al. | |
| 8,498,967 B1 | 7/2013 | Chatterjee et al. | |
| 8,549,187 B1 | 10/2013 | Christopher et al. | |
| 8,689,043 B1 | 4/2014 | Bezbaruah et al. | |
| 2002/0103663 A1* | 8/2002 | Bankier et al. | 705/1 |
| 2003/0050966 A1* | 3/2003 | Dutta et al. | 709/203 |
| 2003/0145179 A1 | 7/2003 | Gabber et al. | |
| 2003/0237019 A1 | 12/2003 | Kleiman et al. | |
| 2004/0003111 A1* | 1/2004 | Maeda et al. | 709/237 |
| 2004/0064568 A1* | 4/2004 | Arora et al. | 709/228 |
| 2004/0098447 A1 | 5/2004 | Verbeke et al. | |
| 2004/0260761 A1* | 12/2004 | Leaute et al. | 709/201 |
| 2004/0260976 A1 | 12/2004 | Ji et al. | |
| 2005/0080858 A1* | 4/2005 | Pessach | 709/206 |
| 2005/0108368 A1* | 5/2005 | Mohan et al. | 709/220 |
| 2005/0251633 A1 | 11/2005 | Micka et al. | |
| 2005/0278483 A1 | 12/2005 | Andruszkiewicz et al. | |
| 2007/0198710 A1* | 8/2007 | Gopalakrishnan | 709/225 |
| 2007/0220223 A1 | 9/2007 | Boyd et al. | |
| 2007/0244894 A1* | 10/2007 | St. Jacques | 707/9 |
| 2008/0008179 A1 | 1/2008 | Chen et al. | |
| 2008/0019365 A1 | 1/2008 | Tripathi et al. | |
| 2008/0168303 A1 | 7/2008 | Spear et al. | |
| 2008/0201391 A1 | 8/2008 | Arakawa et al. | |
| 2009/0006744 A1 | 1/2009 | Cavallo et al. | |
| 2009/0150626 A1 | 6/2009 | Benhase et al. | |
| 2009/0276543 A1* | 11/2009 | Turner et al. | 709/248 |
| 2010/0036850 A1 | 2/2010 | Garman et al. | |
| 2010/0329268 A1* | 12/2010 | Hautakorpi et al. | 370/400 |
| 2010/0333094 A1 | 12/2010 | Restall et al. | |
| 2011/0072075 A1* | 3/2011 | Gautier | 709/203 |
| 2011/0087731 A1* | 4/2011 | Wong et al. | 709/204 |
| 2011/0099351 A1 | 4/2011 | Condict | |
| 2011/0197040 A1 | 8/2011 | Oogai et al. | |
| 2011/0225297 A1* | 9/2011 | Archer et al. | 709/225 |
| 2012/0110057 A1* | 5/2012 | Hautakorpi et al. | 709/201 |
| 2012/0197962 A1* | 8/2012 | Maenpaa et al. | 709/201 |
| 2013/0046811 A1* | 2/2013 | Park et al. | 709/203 |
| 2013/0061232 A1 | 3/2013 | Bernbo et al. | |
| 2013/0151663 A1* | 6/2013 | He et al. | 709/217 |
| 2013/0315240 A1 | 11/2013 | Kobayashi | |
| 2014/0218248 A1 | 8/2014 | Schulz et al. | |

OTHER PUBLICATIONS

Feller et al., "Snooze: A Scalable and Automatic Virtual Machine Management Framework for Private Clouds", 2012 12th IEEE/ACM International Symposium on Cluster, Cloud and Grid Computing, May 13, 2012, pp. 482-489.

Xu et al., "A Cloud Computing Platform Based on P2P", IT in Medicine & Education, 2009. ITIME '09. IEEE International Symposium on, Aug. 14, 2009, pp. 427-432.

Chandrasekar et al., "A Novel Indexing Scheme for Efficient Handling of Small Files in Hadoop Distributed File System", 2013 International Conference on Computer Communication and Informatics, Jan. 4, 2013, pp. 1-8.

International Search Report and Written Opinion, dated Jan. 29, 2015 for International Patent Application No. PCT/US2013/065623.

International Search Report and Written Opinion, dated Apr. 29, 2014 for International Patent Application No. PCT/IB2013/001931.

Weil; Scott A. Brandt; Ethan L. Miller; Carlos Maltzahn; , "Crush: Controlled, Scalable, Decentralized Placement of Replicated Data," Proceedings of the 2006 ACM/IEEE Conference on Supercomputing, Nov. 2006, 12 pages.

Tushar Deepak Chandra, Robert Griesemer, and Joshua Redstone, "Paxos Made Live—An Engineering Perspective (2006 Invited Talk)", Proceedings of the 26th Annual ACM Symposium on Principles of Distributed Computing, ACM press (Jun. 2007) 16 pages.

* cited by examiner

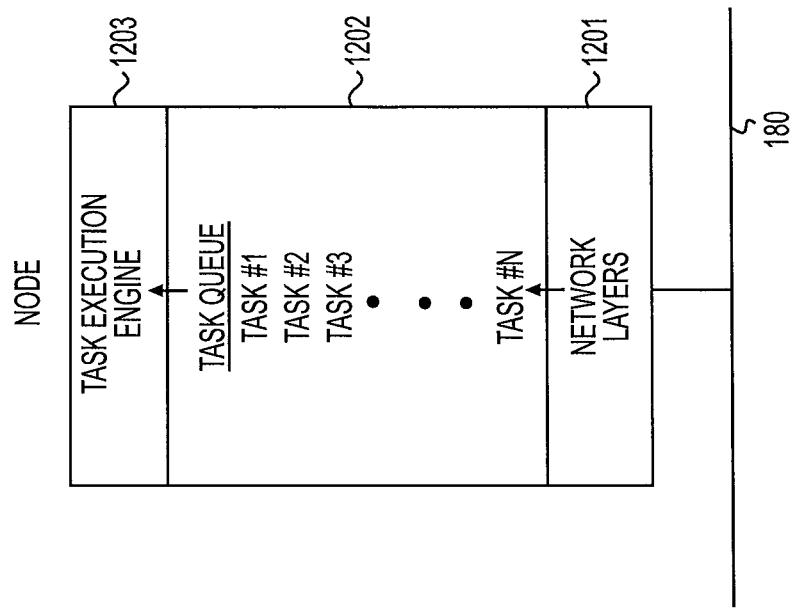

| TASK | UUID | NODE | STATUS | START TIME | FINISH TIME |
|---|---|---|---|---|---|
|  | UUID #1 | 130 |  |  |  |
|  | UUID #4 | 160 |  |  |  |
|  | UUID #5 | 170 |  |  |  |
| ... | ... | ... | ... | ... | ... |

TASK LOG 335

*FIG. 11B*

| TARGET FILE PATHNAME | "/my/data/archive/file1234" |
|---|---|
| MAPPING FILE PATHNAME | "/my/data/archive/file1234::location" |

LOCATING FILE DATA FROM A MAPPING FILE

CROSS-REFERENCE TO RELATED APPLICATIONS

This application is a continuation of U.S. application Ser. No. 14/535,850, filed on Nov. 7, 2014, and claims priority from PCT Application No. PCT/IB2013/001931 filed on Jun. 19, 2013, the entire disclosures of all applications are hereby incorporated by reference.

FIELD OF THE INVENTION

The present invention generally relates to computer systems, and more specifically to techniques for operating a distributed system of networked devices or nodes.

BACKGROUND OF THE INVENTION

In order to provide scalability in the size and bandwidth of a distributed file system, conventional storage systems have spread the storage of files across a plurality of storage nodes in a distributed storage system. Conventionally, while the storage of files in storage nodes has been dispersed, the management of the file system, processing and file metadata have been centralized in a control node or task management node.

In conventional distributed file systems, methods for locating data within the file system have used mechanisms which are considered "out-of-band" or unsupported by the protocols typically used to access the file system. One example of an out-of-band mechanism is used in the ParaScale™ distributed storage platform. In a ParaScale™ distributed storage platform, a centralized task manager or master, opened a file over a mount point exported via Network File System (NFS), obtained key information about the file using a "stat" operation, and then communicated a data location service on a control node using the file's key information, a received Extensible Markup Language (XML) information of the location of data, such as a server's address. A client of the ParaScale™ platform could then launch a data task with the server's address.

As noted above, conventional distributed file systems use a centralized task manager which is responsible for coordinating tasks on all nodes. Typically, the task manager directs the other nodes to execute tasks. While such a configuration allows for tasks to be performed in a known order, if the task manager fails, the resiliency of the distributed file system will suffer since the task manager must recover from the failure before additional tasks can be launched. Furthermore, a log of pending tasks has conventionally been placed on shared persistent storage or replicated between multiple nodes. As such, the task manager poses a problem of being a single point of failure for the distributed file system.

In distributed systems, IP address assignment to nodes in the system has conventionally been handled by Dynamic Host Configuration Protocol (DHCP). If virtual machines are present in the distributed system, DHCP poses a problem in that DHCP generally assigns IP addresses to all systems in the network. As a result, problems exist in DHCP with respect to configuring a DHCP server which can be readily isolated to provide IP addresses to only the virtual machines present in the distributed system.

BRIEF SUMMARY OF THE INVENTION

The embodiments of the present invention generally relate to a distributed computer system, and more specifically to techniques for managing the issuing of tasks across a distributed storage system (herein a "cluster") including techniques for determining the location in the distributed storage system at which certain tasks should be launched, the task of creation of virtual machines with reliable IP addresses, and fault recovery of tasks in the distributed storage system.

In view of the problems in conventional distributed systems, in some embodiments of the present invention, a cluster is configured so that tasks may be issued from any node in the cluster to any other or all other nodes in the cluster, and tasks can be stored and executed with resiliency and fault tolerance characteristics. For example, the cluster employs a consensus algorithm, such as the Paxos algorithm for implementing a fault-tolerant distributed system, whereby tasks can be distributed and processed in a known order on each node, a subset of nodes or all nodes in the cluster. In some embodiments, if a node is offline, whether due to a failure or the like, and a task is defined for the offline node, the task must be run when the node comes back online (e.g., recovers from the failure). By using a consensus algorithm, pending tasks are launched from any node in the cluster as one or more ordered messages and broadcast to all nodes in the cluster. For example, a consensus algorithm such as the one described in "Paxos Made Simple SIGACT News, Vol. 32, No. 4. (December 2001), pp. 51-58, by Leslie Lamport," which is incorporated herein by reference, or a variant thereof may be used. As a result, the foregoing embodiments advantageously provide a decentralized, distributed system which allows for fault tolerance and node resiliency.

Further, in other embodiments of the present invention, when a task of starting a virtual machine (VM) on a node in the cluster is launched, a configuration file containing the specific characteristics of the virtual machine is referenced which includes a media access control (MAC) address to be used by the virtual machine. According to various embodiments of the present invention, an IP address to be used by the virtual machine is encoded in the MAC address. As a result, the VM can be given an IP address, such as IPv4, which does not conflict with the other IP addresses used in the cluster and a Dynamic Host Configuration Protocol (DHCP) server does not need to be relied upon to attempt to assign IP addresses to virtual machines. As a result, the foregoing embodiments advantageously allow IP addresses to be set for virtual machines using the MAC address as a conduit to communicate the IP address from a hosting node through a hypervisor to the virtual machine.

Still further, in yet other embodiments of the present invention, a file system has an extended namespace in which every file has a corresponding mapping file with a special extension which specifies data locations of the file in the cluster. By extending the namespace to include special extension to specify the mapping file, the mapping file can be accessed in the file system using a protocol, such as Network File System (NFS) v3.1, typically used to access data stored in the file system. However, the mapping files would not be visible in normal directory listings of the file system. As a result, the foregoing embodiments advantageously allow access to location information of data in the cluster using the same mechanism used to access the data itself.

BRIEF DESCRIPTION OF THE DRAWINGS

FIG. 11A is a management table according to an embodiment of the present invention.

FIG. 11B is a task log according to an embodiment of the present invention.

FIG. 12 is an abstract block diagram of network layers, a task queue layer and an execution layer of a node according to an embodiment of the present invention.

DETAILED DESCRIPTION OF THE INVENTION

Figure 1:
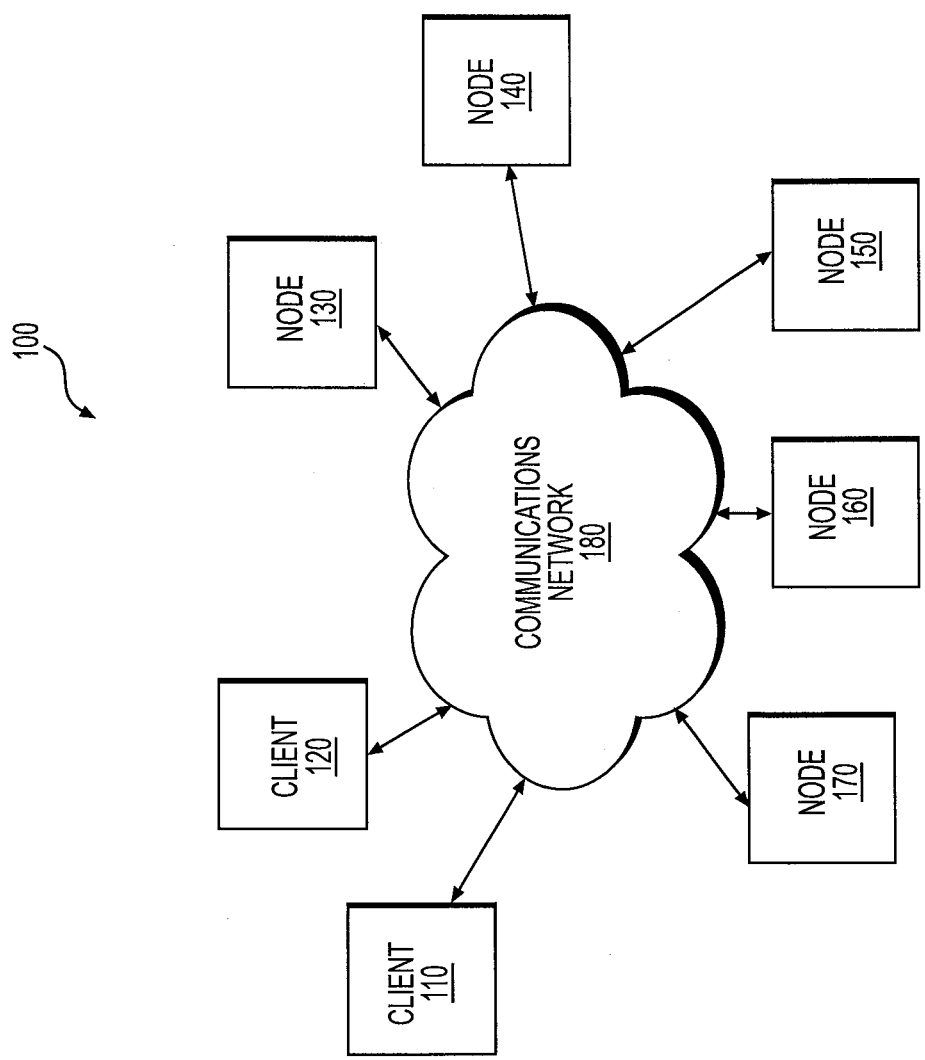
FIG. 1 is a block diagram of a clustered computer system according to an embodiment of the present invention.

The embodiments discussed herein are illustrative of one or more examples of the present invention. As these embodiments of the present invention are described with reference to the drawings, various modifications or adaptations of the methods and/or specific structures described herein may become apparent to those skilled in the art. All such modifications, adaptations, or variations that rely upon the teachings of the present invention are considered to be within the scope of the present invention. Hence, the present descriptions and drawings should not be considered in a limiting sense, as it is understood that the present invention is in no way limited to only the embodiments shown therein.

Clustered Computer System

According to various embodiments, a scalable distributed computer system (referred to herein as a "cluster"), such as a clustered storage system, separates namespace and metadata attributes of files in a file system from the actual data content of files. In one embodiment, one or more nodes, which may be implemented as servers, are responsible for handling the namespace, metadata, and location information of files. Further, the nodes are responsible for access to files in the file system and may also be responsible for providing the physical storage space. Each node typically employs a shared-nothing architecture, meaning that each node has at least one corresponding storage device, whether locally or attached through a storage area network (SAN) and the like which is not shared with other nodes in the cluster.

In the cluster according to some embodiments, the file system itself spans the cluster, and is not physically tied to a particular node or subset of nodes within the cluster. Accordingly, the cluster is able to be scaled in several dimensions. Nodes may be added in order to scale capacity and bandwidth for serving files stored in the file system. Each node may provide both processing and storage capabilities. Moreover, nodes may be added to redistribute the load of operations across the cluster.

In some embodiments, users (e.g., client computer systems) may use industry standard protocols without modification to mount file systems, access files within the cluster from nodes, and perform other tasks on and/or in the cluster. In some embodiments, the cluster provides a global namespace allowing users to see the entire file system regardless of the node used for access to the file system.

Accordingly, a distributed shared-nothing storage system in one embodiment of the present invention includes nodes which store metadata, object identifiers, and location information associated with a plurality of files in a file system and a plurality of nodes that store the plurality of files. A node in the cluster is capable of receiving a request for a file in the file system from a client and determining the location of the file within the cluster. The node communicates with the other nodes to determine metadata, object identifier, and location information associated with the file. The node then accesses the file in the file system to service the request from the client using the metadata, the object identifier, and the location information received from the cluster.

FIG. 1 is an illustration of a distributed computer system (e.g., cluster) 100 according to an embodiment of the present invention. The cluster 100 includes clients 110 and 120, nodes 130, 140, 150, 160, and 170. The clients 110 and 120, and nodes 130, 140, 150, 160, and 170 are communicatively coupled using a communications network 180. Alternatively, there may be one or more networks which connect the clients 110 and 120 and the nodes 130, 140, 150, 160, and 170.

Figure 2:
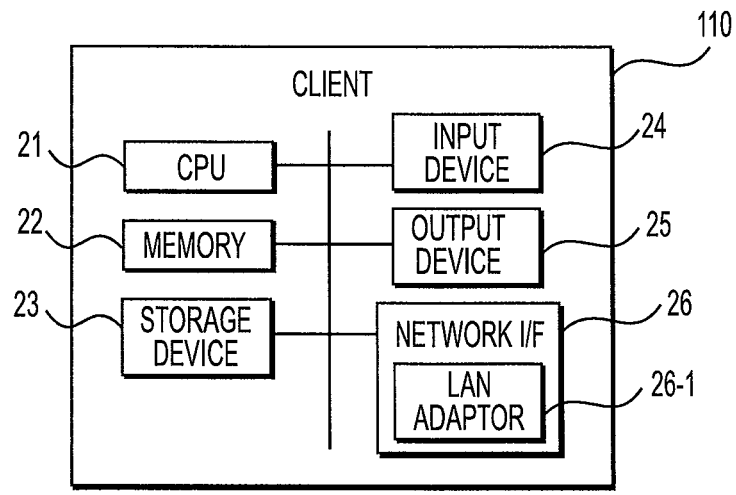
FIG. 2 is a block diagram of a client according to an embodiment of the present invention.

Generally, the clients 110 and 120 are computer systems such as personal computers (PCs), workstations, laptops, personal digital assistants (PDAs), servers, mainframes, and the like. The clients 110 and 120 are configured to access remote files and file systems using file access protocols, such as NFS, CIFS, HTTP, FTP, and the like. One example of a computer system suitable for implementing the clients 110 and 120 is shown in FIG. 2.

Figure 3:
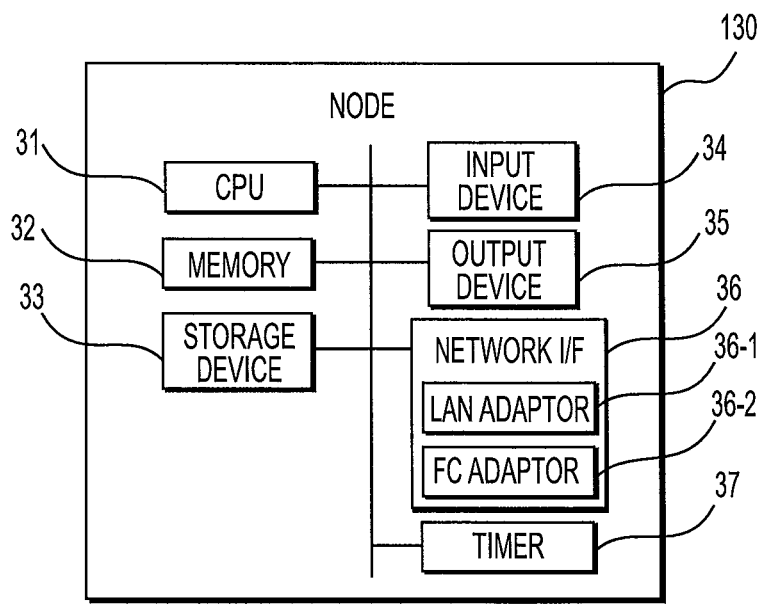
FIG. 3 is a block diagram of a node according to an embodiment of the present invention.

The nodes 130, 140, 150, 160, and 170 may be PCs, workstations, servers, mainframes, and the like. The nodes store information associated with files in a file system on a local file system, network attached storage (NAS), a storage area network (SAN), a database, and the like. The nodes may also store information associated with files in a file system in a combination of a local file system and a database. One example of a computer system suitable for implementing the nodes 130, 140, 150, 160, and 170 is shown in FIG. 3. However, the nodes 130, 140, 150, 160, and 170 may also be any hardware and/or software elements configured to store files in a file system. The nodes 130, 140, 150, 160, and 170 may implement one or more file systems to store files, such as NTFS, EXT, XFS, and the like.

Information associated with files in a file system includes namespace, metadata, an object identifier and location information. Namespace includes a hierarchical tree-based file path and naming scheme common in most file systems. Metadata includes file attributes, such as a file name, permissions, size, type, and the like. Object identifier is a cluster-wide globally unique 128-bit identifier that is used for naming and storage of files in an object-based storage area on a node. Location information includes information associated with the logical and/or physical location of a file in a file system. For example, the location information may specify a given node, an object store attached to a node, path information, and the like.

In one example of operation, the client 110 sends a request for a file in a file system, such as a request to read from a file, to node 150. The node 150 then determines metadata, object identifier, and location information associated with the file and optimally caches this information locally in its RAM. In this example, the node 150 determines an object identifier associated with the name of the file, and from the object identifier, determines the location of the file. The node 150 may send the object identifier and the location of the file to the client 110 or to other nodes in the cluster. Detailed operation of file location operation according to various embodiments of the present invention will be described later.

According to one embodiment, the node 150 may reference a special mapping file to determine the object identifier and the location of the file to locate the file in the file system. For example, the location information may specify via the special mapping file to the node 150 that the file is stored locally on node 160. The node 150 may then provide this information to the client 110 so that the client 110 may access the node 160 directly. In some embodiments, the node 150 may read and write files from or to other nodes using an Internet Protocol (IP) based transport mechanism, some examples of which are HTTP or NFS cross mounts. The location information may also direct node 150 to access the file using a portion of the file system stored on the node 150. In another exemplary embodiment, the object identifier and the location of the file may be used to access the file in the file system at one node from another node. For example, the location information may direct node 150 to access the file on node 160.

According to various embodiments, the cluster 100 separates namespace, metadata and location information associated with files in a file system from the actual storage of the files by the nodes 130, 140, 150, 160, and 170. Accordingly, various embodiments provide enhanced access to file system objects using the cluster 100 regardless of the location of a file within a node. Additionally, in various embodiments, additional nodes may be added to the storage system, increasing storage capacity and reducing file access time in the storage system.

In some embodiments, a pool of network addresses, such as Internet Protocol (IP) addresses may be allocated and assigned to the nodes. Upon a node failure (e.g., node 150), the nodes 130 and 140 dynamically reassign the network address (e.g., the IP address) associated with the failed node 150 to a functioning node (e.g., storage node 160). Thus, client/user access to files previously using node 150 may be transparently moved and/or redirected to a new node (i.e., storage node 160). In still other embodiments, a failed node is able to query the cluster to determine if any tasks have been missed during the time failed node was down (e.g., failed).

FIG. 2 shows a block diagram of the client 110, and client 120 may have a similar configuration as the client 110. As shown in FIG. 2, hardware of the client apparatus includes a CPU 21, a volatile or nonvolatile memory 22 (RAM or ROM), a storage device 23 (e.g., a hard disk drive, a semiconductor memory (SSD (Solid State Drive)), an input device 24 such as a keyboard and a mouse, an output device 25 such as a liquid crystal monitor and a printer, and a network interface (hereinafter, network I/F 26) such as an NIC (Network Interface Card), a LAN Adaptor 26-1 and the like.

FIG. 3 shows a block diagram of the node 130 and nodes 140, 150, 160, and 170 may have similar configurations as the node 130. As shown in FIG. 3, the node 130 includes a CPU 31, a volatile or nonvolatile memory 32 (RAM or ROM), a storage device 33 (e.g., a hard disk drive, a semiconductor memory (SSD)), an input device 34 such as a keyboard and a mouse, an output device 35 such as a liquid crystal monitor and a printer, a network interface (hereinafter, network I/F 36) such as an NIC, LAN Adaptor 36-1, an HBA (e.g., FC adaptor 36-2) and the like, and a timer 37 configured by using a timer circuit, an RTC, and the like.

Figure 4:
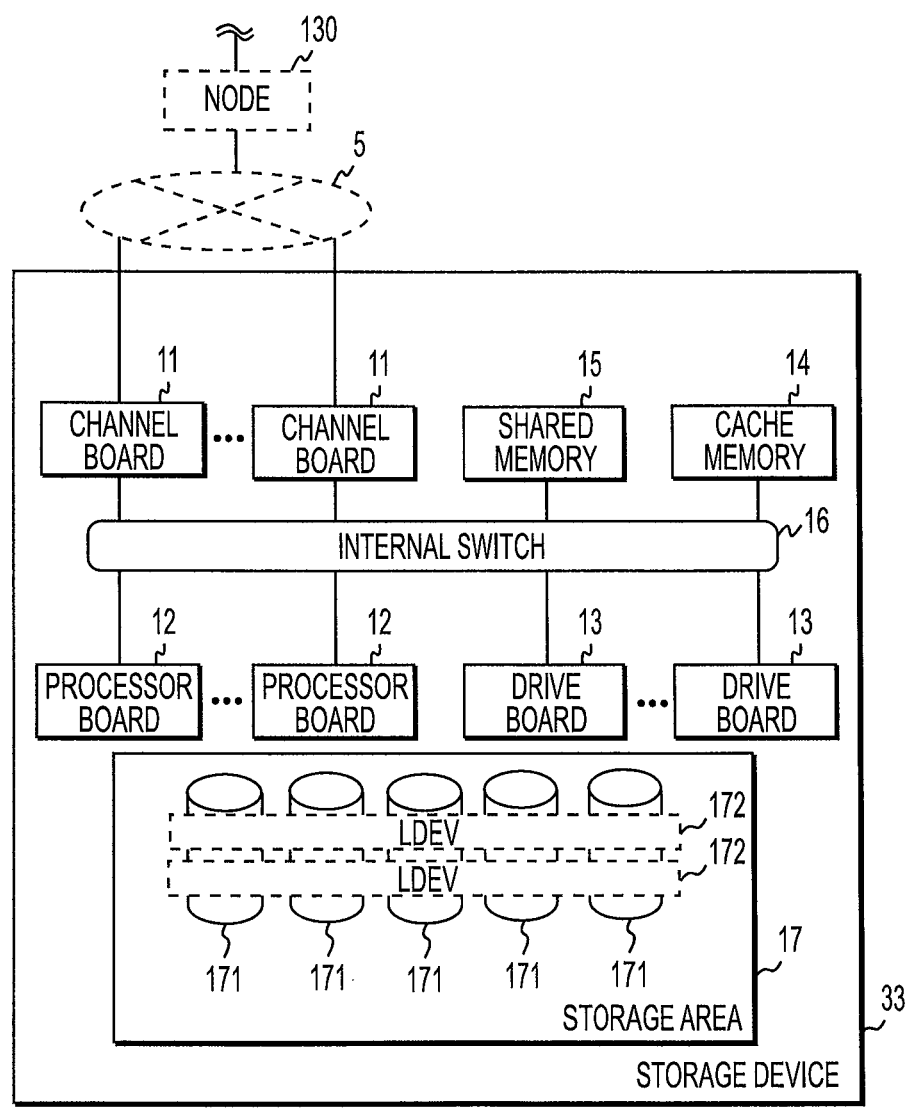
FIG. 4 is a detailed block diagram of a storage device of a node according to an embodiment of the present invention.

FIG. 4 shows a more detailed block diagram of the storage device 33 which may be provided locally to the node 130 as in FIG. 3 or which may be a network attached storage (NAS) via a network 5 as in FIG. 4. The node 130 has a storage device 33. The nodes 140, 150, 160, and 170 are each provided with a storage device 33 which is not shared with the cluster. The storage device 33 receives the I/O requests transmitted from the clients 110 and 120 and also other nodes in the cluster, and in response to the received data I/O request, accesses a storage area 17 and transmits data or a response to the cluster 100.

As shown in FIG. 4, the storage device 33 includes at least one channel board 11, at least one processor board 12 (Microprocessor), at least one drive board 13, a cache memory 14, a shared memory 15, an internal switch 16, and a storage area 17. The channel board 11, the processor board 12, the drive board 13, the cache memory 14 and the shared memory 15 are communicatively coupled to each other via the internal switch 16.

The channel board 11 receives a frame transmitted from the cluster 100 and sends the cluster 100 a frame containing a response of a task (for example, read data, read complete report or write complete report, add storage, etc.) for the request contained in the received frame.

The processor board 12 performs, in response to the above-mentioned data I/O request contained in the frame received by the channel board 11, processing of data transfer (high-speed large capacity data transfer using direct memory access (DMA) or the like) among the channel board 11, the drive board 13 and the cache memory 14. The processor board 12 performs transfer (delivery) of data (data read from or to be written into the storage area 17) between the channel board 11 and the drive board 13, and staging (data reading from the storage area 17) and de-staging (data writing to the storage area 17) of the data to be stored in the cache memory 14.

The cache memory 14 is configured using a RAM (Random Access Memory) capable of high-speed access. The cache memory 14 stores therein data to be written to the storage area 17 (hereinafter, referred to as write data), data read from the storage area 17 (hereinafter, referred to as read data), and the like. The shared memory 15 stores therein various kinds of information used for controlling the storage device 33.

The drive board 13 performs communication with the storage area 17 when reading data from the storage area 17 or writing data to the storage area 17. The internal switch 16 is configured using, for example, a high-speed cross bar switch. Communication via the internal switch 16 is performed, for example, in accordance with a protocol such as fibre channel, iSCSI, TCP/IP, and the like.

The storage area 17 includes a plurality of storage drives 171. Each storage drive 171 is, for example, a hard disk drive, semiconductor storage device (SSD) or the like of a type such as SAS (Serial Attached SCSI), SATA (Serial ATA), FC (Fibre Channel), PATA (Parallel ATA), and SCSI.

The storage area 17 provides the server system 3 with a storage area of the storage area 17 in units of logical storage areas provided by controlling the storage drives 171 in accordance with a method such as, for example, a RAID (Redundant Array of Inexpensive (or Independent) Disks) or the like. The logical storage area is a logical device including, for example, a RAID group.

The storage device 33 provides the node 130 with a logical storage area configured using the logical devices 172. The storage device 33 manages the correspondence (relation) between the logical storage area and the logical devices 172. Based on the correspondence, the storage device 33 identifies logical devices 172 corresponding to the logical storage area or identifies physical devices corresponding to the logical devices 172. In another alternative embodiment, the storage area 17 may be configured such that an object based storage area is provided to the node 130.

Figure 5:
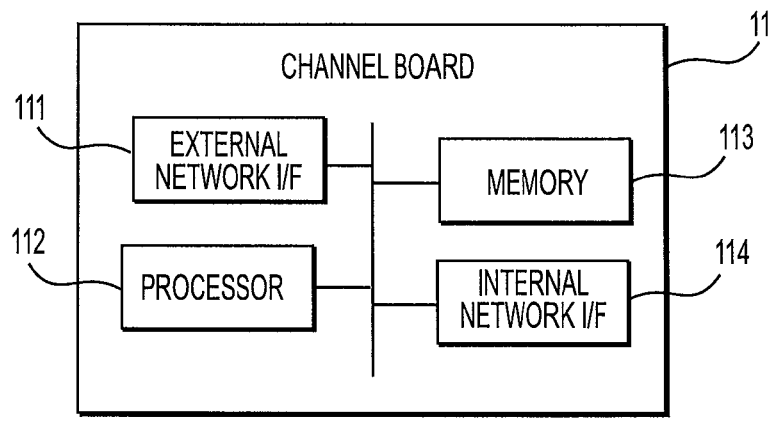
FIG. 5 is a block diagram of a channel board of a node according to an embodiment of the present invention.

FIG. 5 shows a hardware configuration of each of the channel boards 11. As shown in FIG. 5, the channel board 11 includes an external communication interface (hereinafter, referred to as an external network I/F 111) having a port (communication port) for communicating with the server system 3, a processor 112 (including a frame processing chip and a frame transfer chip), a memory 113, and an internal communication interface (hereinafter, referred to as an internal network I/F 114) which includes a port (communication port) for communicating with the processor board 12.

The external network I/F 111 is configured using an NIC (Network Interface Card), an HBA (Host Bus Adaptor), and the like. The processor 112 is configured using a CPU (Central Processing Unit), an MPU (Micro Processing Unit), and the like. The memory 113 is a RAM (Random Access Memory) or a ROM (Read Only Memory). The memory 113 stores therein data such as micro programs, software, other operational data and the like. Various functions provided by the channel board 11 are implemented when the processor 112 reads and executes the above-mentioned data stored in the memory 113. The internal network I/F 114 communicates with the processor board 12, the drive board 13, the cache memory 14, and the shared memory 15 via the internal switch 16.

Figure 6:
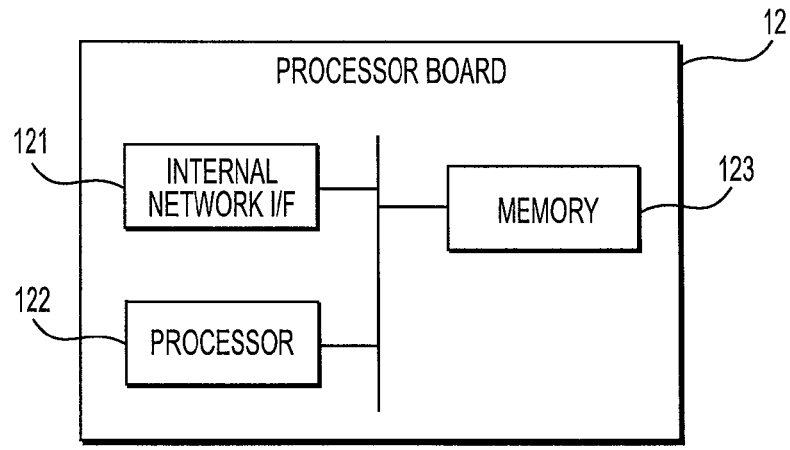
FIG. 6 is a block diagram of a processor board of a node according to an embodiment of the present invention.

FIG. 6 shows a hardware configuration of the processor board 12. The processor board 12 includes an internal network interface (hereinafter, referred to as an internal network I/F 121), a processor 122, and a memory 123 (local memory) of which an access performance from the processor 122 is higher than the shared memory 15 (i.e., high speed access thereto is possible). The memory 123 stores therein micro programs. Various functions provided by the processor board 12 are implemented when the processor 122 reads and executes the micro programs stored in the memory 123.

The internal network I/F 121 communicates with the channel board 11, the drive board 13, the cache memory 14, and the shared memory 15 via the internal switch 16. The processor 122 is configured using a CPU, an MPU, a DMA (Direct Memory Access), and the like. The memory 123 is a RAM or a ROM. The processor 122 can access both the memory 123 and the shared memory 15.

Figure 7:
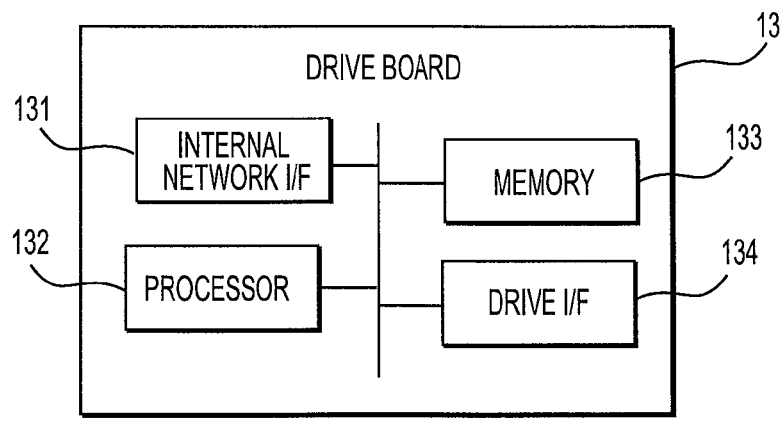
FIG. 7 is a block diagram of a drive board of a node according to an embodiment of the present invention.

FIG. 7 shows a hardware configuration of the drive board 13. The drive board 13 includes an internal network interface (hereinafter, referred to as an internal network I/F 131), a processor 132, a memory 133, and a drive interface (hereinafter, referred to as a drive I/F 134). The memory 133 stores therein micro programs. Various functions provided by the drive board 13 are implemented when the processor 132 reads and executes the micro programs stored in the memory 133. The internal network I/F 131 communicates with the channel board 11, the processor board 12, the cache memory 14, and the shared memory 15 via the internal switch 16. The processor 132 is configured using a CPU, an MPU, and the like. The memory 133 is, for example, a RAM or a ROM. The drive I/F 134 communicates with the storage device 17.

A maintenance device not shown in FIG. 4 performs control and status monitoring of components of the storage device 33. The maintenance device is a personal computer, an office computer, or the like. The maintenance device 18 communicates as needed with components of the storage device 33, such as the channel board 11, the processor board 12, the drive board 13, the cache memory 14, the shared memory 15, the internal switch 16, and the like via communication means such as the internal switch 16, a LAN or the like so as to acquire operation information and the like from the components and provide a management apparatus 19 with the information. Further, the maintenance device performs setting, control, and maintenance of the components (including software installation and updating) according to control information and operation information transmitted from a management apparatus.

The management apparatus, not shown in FIG. 4, is a computer which is communicatively coupled to the maintenance device via a LAN or the like. The management apparatus 19 includes a user interface using a GUI (Graphical User Interface) and a CLI (Command Line Interface) for controlling and monitoring the storage device 33. The maintenance device and the management device functions can be provided with hardware similar to the clients 110 and 120.

Figure 8C:
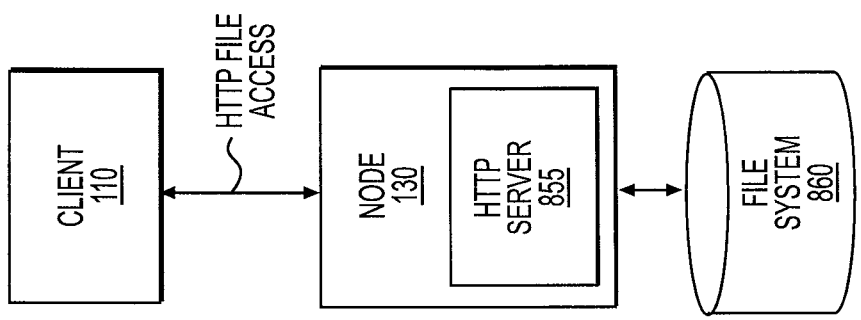
FIGS. 8A, 8B and 8C are block diagrams of client access to file systems according to embodiments of the present invention.
Figure 8B:
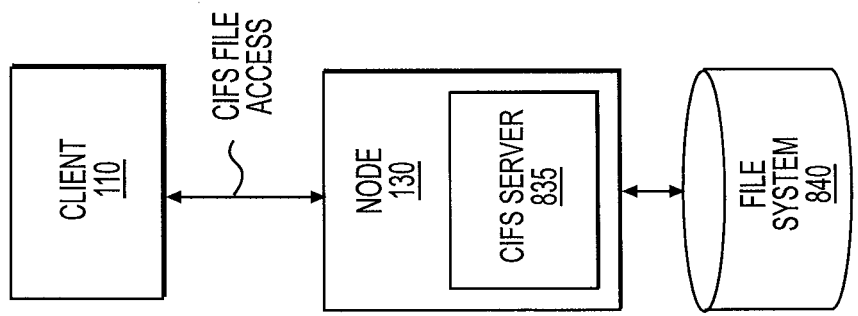
Figure 8A:
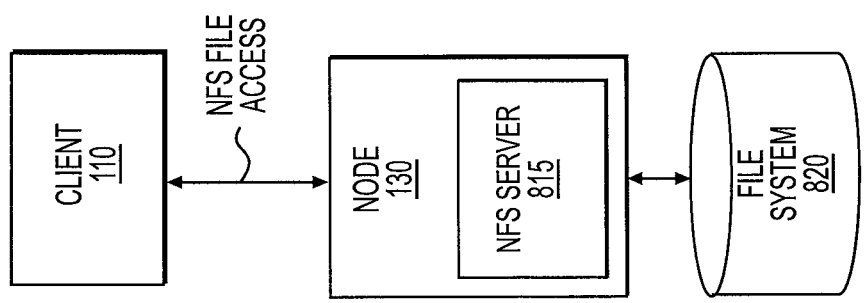

FIGS. 8A, 8B, and 8C illustrate client access to nodes and network file systems according to various embodiments of the present invention. Referring to FIG. 8A, a client system 110 uses a Network File System (NFS) file access to communicate with a node of the cluster (e.g., node 130). The node 130 includes an NFS server 815 and is coupled to a file system 820. Referring to FIG. 8B, a client system 110 uses a Common Internet File System (CIFS) file access to communicate with the node 130. In FIG. 8B, the node 130 includes a CIFS server 835 and is coupled to a file system 840. Referring to FIG. 8C, a client system 110 uses a hypertext transport protocol (HTTP) file access to communicate with the node 130. In FIG. 8C, the node 130 includes an http server 855 and is coupled to a file system 860.

Figure 9C:
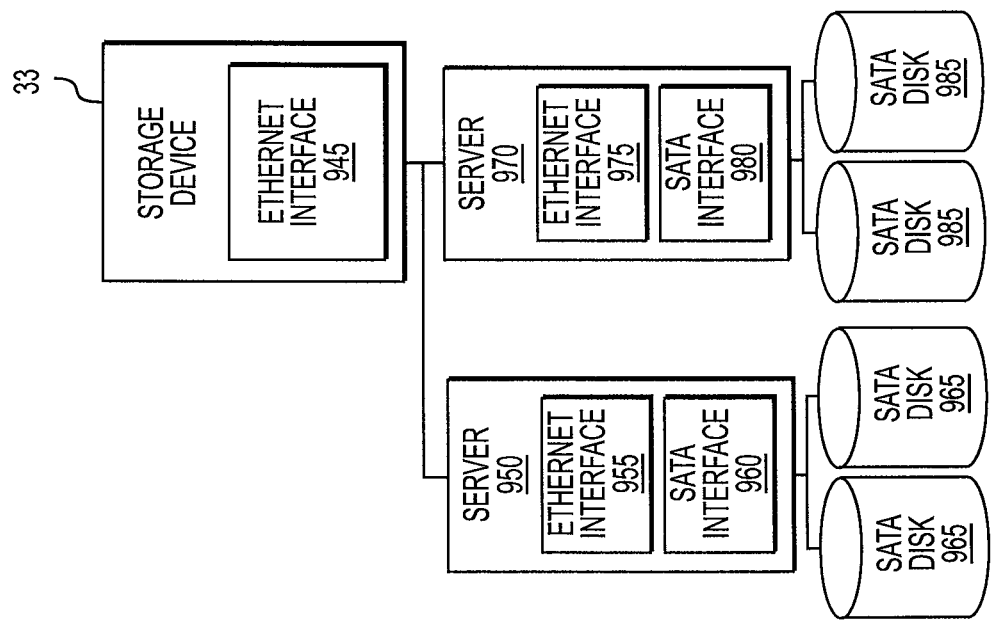
FIGS. 9A, 9B and 9C are block diagrams of storage devices of nodes according to embodiments of the present invention.
Figure 9B:
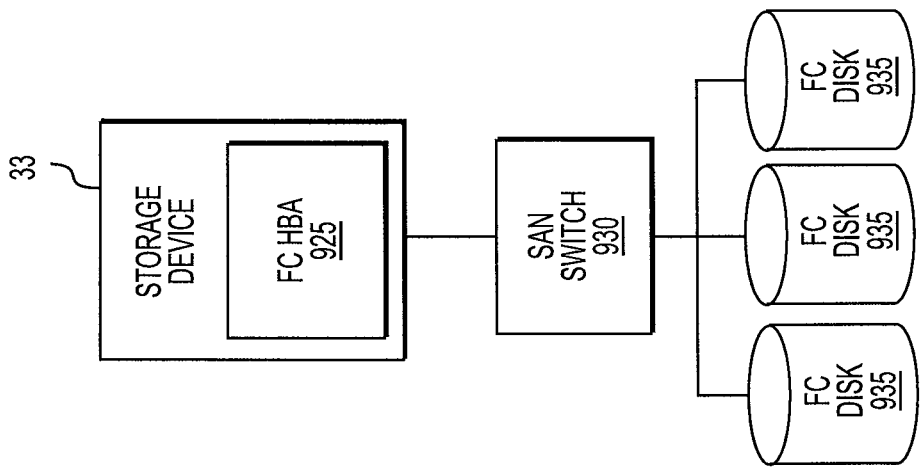
Figure 9A:
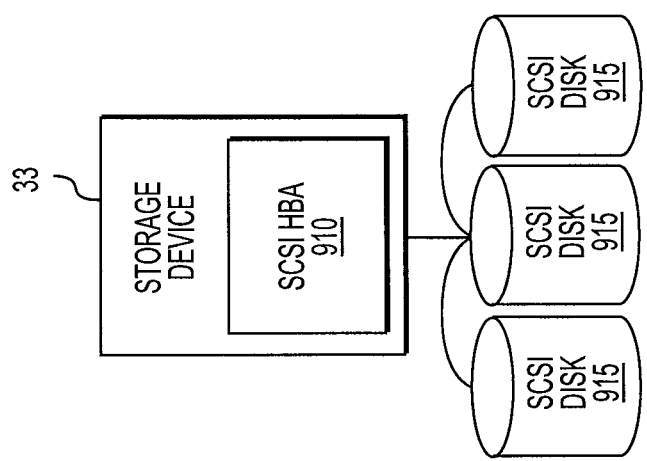

FIGS. 9A, 9B, and 9C illustrate interconnection of storage devices 33 to physical storage devices according to various embodiments of the present invention. Referring to FIG. 9A, a storage device 33 includes a small computer systems interface (SCSI) host bus adapter (HBA) 910. SCSI HBA 910 is coupled to three SCSI disk drives 915. Referring to FIG. 9B, a storage device 33 includes a fibre channel (FC) HBA 925. FC HBA 925 is coupled to a storage area network (SAN)

switch 930. SAN switch 930 is coupled to three FC disks 935. Referring to FIG. 9C, a storage device 33 includes an Ethernet interface 945 and is coupled to a server 950 and a server 970. Server 950 includes an Ethernet interface 955 and a serial advanced technology attachment (SATA) interface 960 coupled to the SATA disks 965. Server 970 includes an Ethernet interface 975 and SATA interface 980 coupled to two SATA disks 985.

Figure 10:
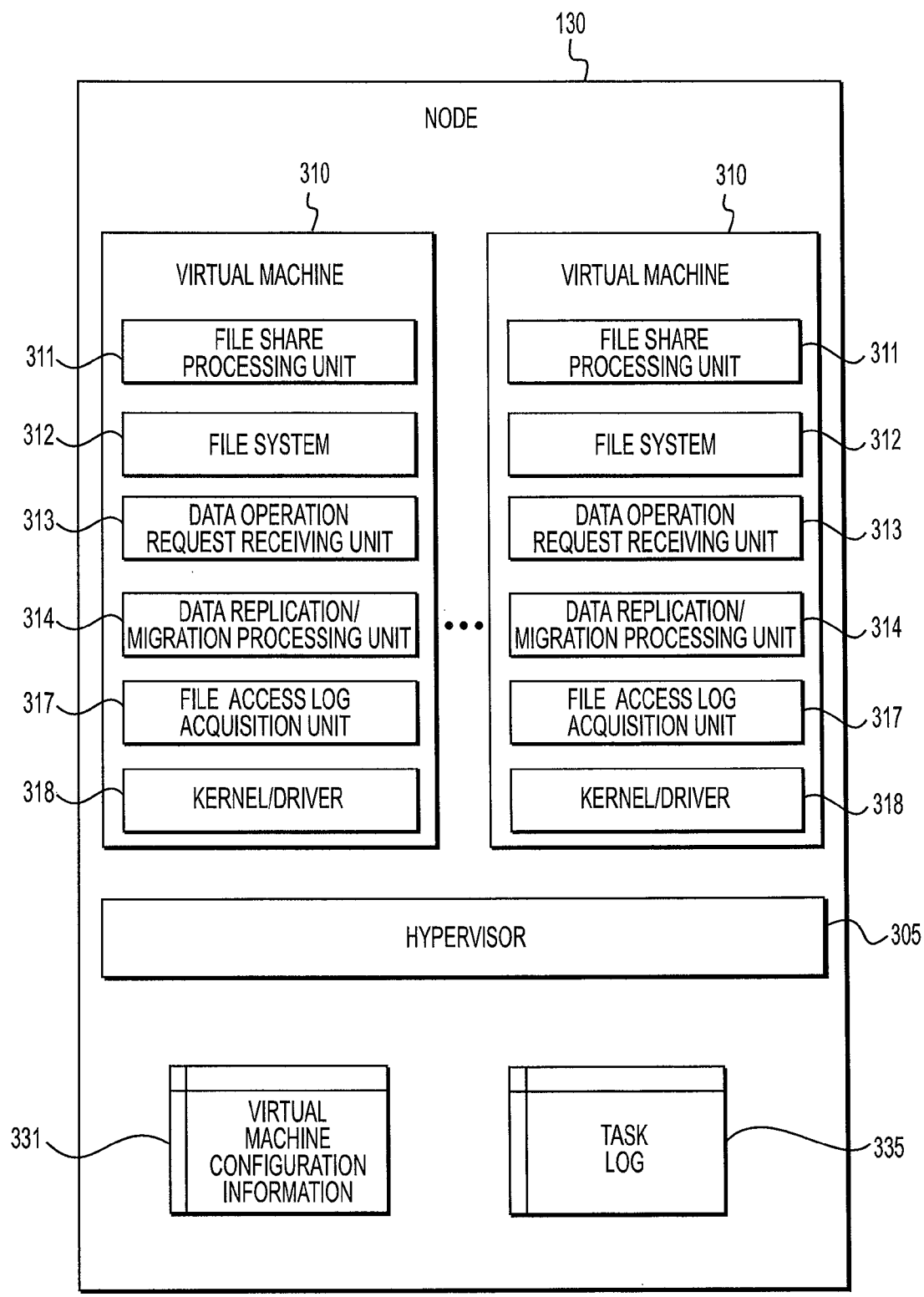
FIG. 10 is a functional block diagram of a node according to an embodiment of the present invention.

FIG. 10 illustrates a functional block diagram of the node 130 and primary information (data) managed in the node 130 according to various embodiments of the present invention. As shown in FIG. 10, in the node 130, a hypervisor (e.g., a hypervisor) 305 providing a virtual environment and at least one virtual machine 310 which operates under the control of the hypervisor 305 are implemented.

In each virtual machine 310, functions of a file share processing unit 311, a file system 312, a data operation request receiving unit 313 which maintains a queue of tasks to be executed, a data replication/migration processing unit 314, a file access log acquisition unit 317, and a kernel/driver 318 are implemented.

The virtual environment may be achieved by a method of a so-called host OS type in which the operating system is intervened between hardware of the node 130 and the hypervisor 305 or a method of a hypervisor type in which the operating system is not intervened between hardware of the node 130 and the hypervisor 305. Functions of the data operation request receiving unit 313, the data replication/migration processing unit 314 and the file access log acquisition unit 317 may be implemented as functions of the file system 312, or as functions independent from the file system 312.

As shown in FIG. 10, in various embodiments of the present invention, the node 130 stores virtual machine configuration information 331, a task log 335, and the like in the memory 32 and the storage device 33 of the node 130 as needed.

Of the functions illustrated in FIG. 10, the file share processing unit 311 provides the client 110 with an environment where files can be shared. The file share processing unit 311 provides the functions specified, for example, in the protocol of NFS (Network File System), CIFS (Common Internet File System), AFS (Andrew File System), and the like.

The file system 312 provides the client 110 with functions related to I/O to and from a file (or a directory) managed by the logical volume (LU) provided by the nodes. The file system 312 is based for example on an FAT (File Allocation Table), NTFS, HFS (Hierarchical File System), ext2 (second extended file system), ext3 (third extended file system), ext4 (fourth extended file system), UDF (Universal Disk Fain at), HPFS (High Performance File system), JFS (Journaled File System), UFS (Unix File System), VTOC (Volume Table Of Contents), XFS, or the like.

The data operation request receiving unit 313 receives a request to perform a task (hereinafter, referred to as a data operation request) relating to a client, such as client 110, for example. The task may include operations such as a replication start request, an update request to a replication file, a reference request to the replication file, a synchronization request, an access request to a metadata, a reference request to a file entity, a recall request, an update request to a stubbed file entity, create a user, add a physical disk, remove a physical disk, configure a logical unit and the like.

Stubbed means that the metadata of data in a file (or directory) is maintained by the node, but the entity of data in the file (or directory) is not stored or managed by the storage device 33. When the node 130 receives a data I/O request such that requires the entity of a stubbed file (or stubbed directory), the entity of the file (or directory) is transmitted (written back, which is hereinafter referred to as recall) to the respective storage device 33.

The data replication/migration processing unit 314 transmits and receives control information (including a flag and a table) and transfers data (including the metadata and the entity of a file) between the node 130 and the other nodes in the cluster 100 and manages various information associated with data replication/migration.

The kernel/driver 318 shown in FIG. 10 is implemented by executing a kernel module and a driver module forming software of the operating system. The kernel module includes programs for implementing basic functions of the operating system, such as process management, process scheduling, management of storage areas, handling of interrupt requests from hardware, and the like, for software executed in the node 130. The driver module includes programs for allowing the kernel module to communicate with hardware configuring the node 130, and peripheral devices used while being coupled to the node 130.

When a file stored in a logical storage area of the storage device 33 is accessed (the file is updated (Write, Update), the file is read (Read), the file is opened (Open), the file is closed (Close), etc.), the file access log acquisition unit 317 shown in FIG. 10 stores the information (hereinafter, referred to as an access log) showing the details (history) of the access in the task log 335 after adding a time stamp to the information, the time stamp being based on the date/time information acquired from the timer 37. Further, additional tasks such as adding storage, removing storage, etc. are maintained with a time stamp in the task log 335. In addition, the tasks stored in the task log 335 are arranged in sequential order so that the task log 335 forms a queue of all tasks launched in the cluster.

Distributed Resilient Work Queues

In the cluster 100 shown in FIG. 1, each node is responsible for processing tasks assigned to itself. According to one embodiment of the present invention, nodes are assigned universally unique identifiers (UUIDs) which allows for each node to identify itself to other nodes in the cluster during communications within the cluster. FIG. 11A shows a management table which stores nodes and their corresponding UUID. Each node in the cluster 100 maintains a management table, as shown in FIG. 11A, so that the UUID list maintained therein can be referenced for communicating with other nodes.

Each node in the cluster maintains a task log 335 as shown in FIG. 11B for tracking tasks which have been and which have been requested to be performed by the nodes in the cluster. In the task log 335, each task is stored in correspondence with one or more UUIDs, other node identifiers, a task status, a start time of the task, and a finish time of the task. In some embodiments, other task related information may be stored as well, such as the time at which the task was received by the node, which client sent the task, etc. Each task sent within the cluster includes at least one UUID which serves to identify the one or more nodes which are to perform the respective task. By maintaining the task log 335 so that each task is stored in correspondence with the UUIDs identifying which nodes should perform the task, in the case a node undergoes a failure, the failed node can query the cluster after recovering from the failure for one or more nodes' task log 335 to determine any tasks which need to be restarted or any tasks which were missed during the failure.

Figure 13:
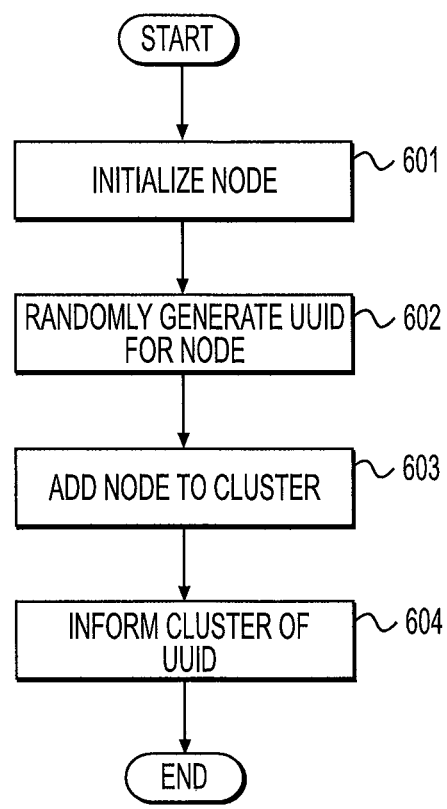
FIG. 13 is a UUID assignment process according to an embodiment of the present invention.

FIG. 13 shows a UUID assignment process according to an embodiment of the present invention. At step 601, a node is initialized. For example, a node is initialized when operating software is installed on the node. At a time during or shortly thereafter the initialization, and preferably before the node attempts to communicate with the cluster, the operating software randomly generates a UUID at step 602 which is used to identify the respective node within the cluster. At step 603, once the node has a UUID with which to identify itself to the cluster 100, the node is added to the cluster 100. For instance, a node may be added to the cluster 100 by connecting the node to the communications network 180. At step 604, the node, having generated a UUID and being connected to the cluster, informs the cluster of its UUID. Accordingly, every node in the cluster which is operable and online should preferably have received the UUID of the node which has just been added to the cluster and updated its respective UUID list to reflect the addition of the node to the cluster.

Figure 14:
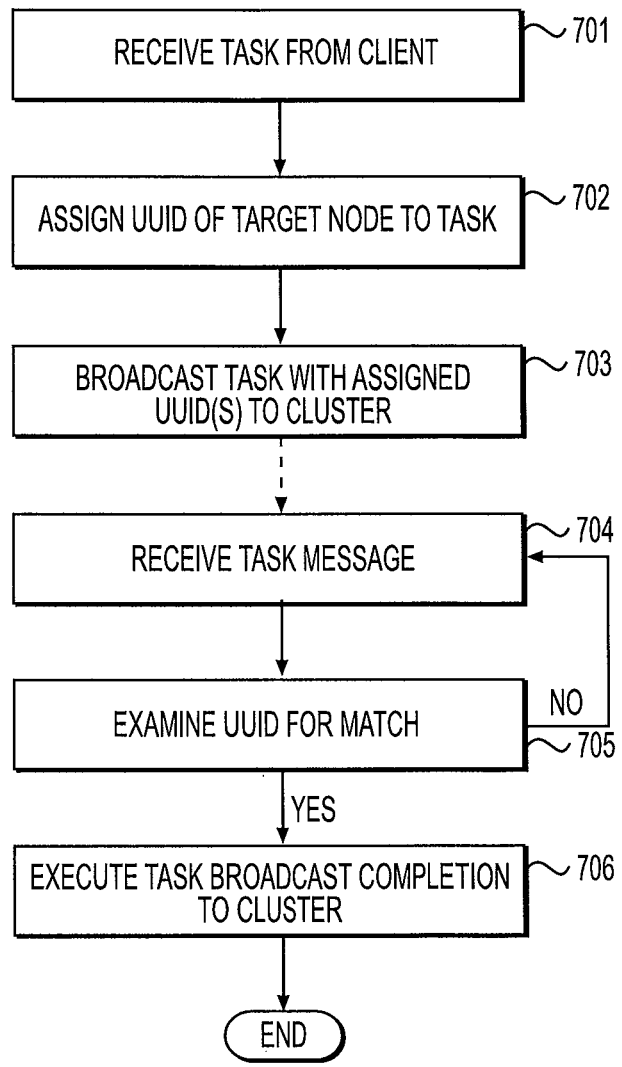
FIG. 14 is a task perform process according to an embodiment of the present invention.

When a task, including the UUID(s) of node(s) which is/are to perform the task, is received at a node, the task log 335 is updated to reflect the reception of the task. Each node executes a task perform process on each received task as shown in FIG. 14. FIG. 12 shows an abstract block diagram of a node which receives a task over the communications network 180. One or more network layers 1201 (e.g., provided by the channel boards 11) pass the tasks to the node. At step 701, a task is received from a client connected to the cluster 100. In some embodiments, the task received from the client will include information identifying one or more nodes which are to perform the task. In other embodiments, the task received from the client will not specify which one or more nodes are to perform the task and a node receiving the task will need to assign the task to the cluster. At step 702, the node receiving the task assigns the UUIDs of nodes which are to perform the task (e.g., target nodes). If the client has specified which nodes are to perform the task, the flow can proceed from step 701 directly to step 703, bypassing step 702. At step 703, a task message including the UUIDs of nodes which are to perform the task is broadcast to the cluster. The nodes of the cluster receive the broadcast task message at step 704. At step 705, each node determines whether the received task includes a UUID which matches the UUID of the node (e.g., whether the task has been assigned to the node). If the task has not been assigned to the node, the node waits to receive the next task message. If the task has been assigned to the node, at step 706, the node will place the task into a task queue 1202 where the task will be executed and will broadcast the completion of the task to the cluster after the task has been executed by a task execution engine layer 1203 (e.g., provided by a processor board 12 or a virtual machine 310). For example, in the embodiment shown in FIG. 10, each virtual machine 310 is provided with a data operation request receiving unit 313 which includes the task queue 1202 for holding tasks which are to be executed. Each node in the cluster upon receiving the notification that the task was completed will update its respective task log 335 accordingly. In addition, in some embodiments, the nodes will notify the cluster of when execution of the task was started and each node in the cluster will update its respective task log 335 of the start time of the task accordingly.

Figure 15:
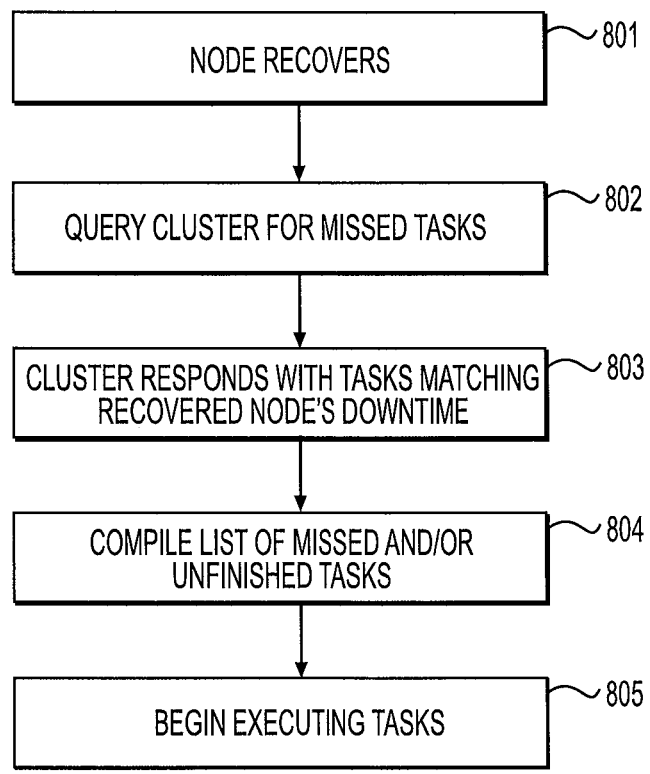
FIG. 15 is a node restart process according to an embodiment of the present invention.

As previously mentioned, in some instances a node may undergo a failure which may cause the failed node to be unable to receive task messages, unable to complete tasks which are under execution, or both. FIG. 15 shows a restart process according to an embodiment of the present invention used to recover missed tasks, restart incomplete tasks or both. At step 801, a node recovers from a failure and begins to operate normally (e.g., recovers from the failure). Next, at step 802, the recovered node queries the cluster for tasks which were broadcast during the period of failure of the node (e.g., the window of time when the node was unable to receive task messages due to the failure). For example, if the node is able to determine the period of failure from its task queue 1202 or task log 335, the other nodes in the cluster can provide the portion of the task logs 335 of nodes operating during the time which correspond to the period of failure. Alternatively, the node could request all task messages which have a timestamp later than the last received task in the recovered node's task log 335. However, it should be apparent to those of skill in the art that the foregoing methods are merely examples and that other methods of recovering the task logs 335 from non-failed nodes in the cluster may be implemented instead.

At step 803, the nodes in the cluster respond to the recovered node and provide a list of tasks which match the recovered node's period of failure. At step 804, the recovered node then compiles a list of missed task messages and examines the missed task messages to determine whether the recovered node's UUID exists in the missed task messages. If any missed task messages are directed to the recovered node, the recovered node will add the missed tasks to a list of tasks for execution. Further, the recovered node should preferably examine its own task log 335 and restart any tasks which have been marked as started but not completed to avoid any erroneous processing due to the failure. At step 805, the recovered node places the tasks in the task queue 1202 and begins executing any tasks which have been missed and/or any tasks which were not completed due to the failure. In step 805, it may be preferable in some embodiments that the tasks are executed in chronological order.

By structuring and maintaining UUID lists and task logs in each node as described above, the managing of tasks becomes decentralized and a failure in a node will not unduly affect the processing of tasks in the remainder of the cluster. Further, a failed node is able to determine any tasks which were defined while the node was inoperable by querying the other nodes in the cluster without needing to rely upon a single management node for such information when such a management node may also experience instances of failure which will adversely affect the recovery of all other nodes relying on the management node for managing a centralized task log.

Virtual Machine IP Address Management

As shown in FIG. 10, in some embodiments of the present invention, a node 130 may execute one or more virtual machines 310 which are based upon virtual machine configuration information 331 and the virtual machines are hosted by a hypervisor 305. In FIG. 10, each virtual machine 310 is isolated from the node which hosts the virtual machines by the hypervisor. From the node's perspective, the virtual machines 310 appear as opaque processes run by the hypervisor. From the virtual machines' perspective, the hypervisor appears as physical hardware resources. Accordingly, other than the hypervisor 305, there is no mechanism for processes run by the node itself to directly interact with processes run by the virtual machines 310 since all communication by the virtual machines occurs over network interfaces.

The hypervisor 305 relies upon the virtual machine configuration information 331 to configure each virtual machine 310. The virtual machine configuration information 331 is set by the node 130 hosting the virtual machines 310. The virtual machine configuration information 331 includes a MAC address specific to each virtual machine 310 instance. In order for a virtual machine 310 to establish network connectivity, a known IP address (e.g., IPv4) must be configured beforehand.

Figure 16:
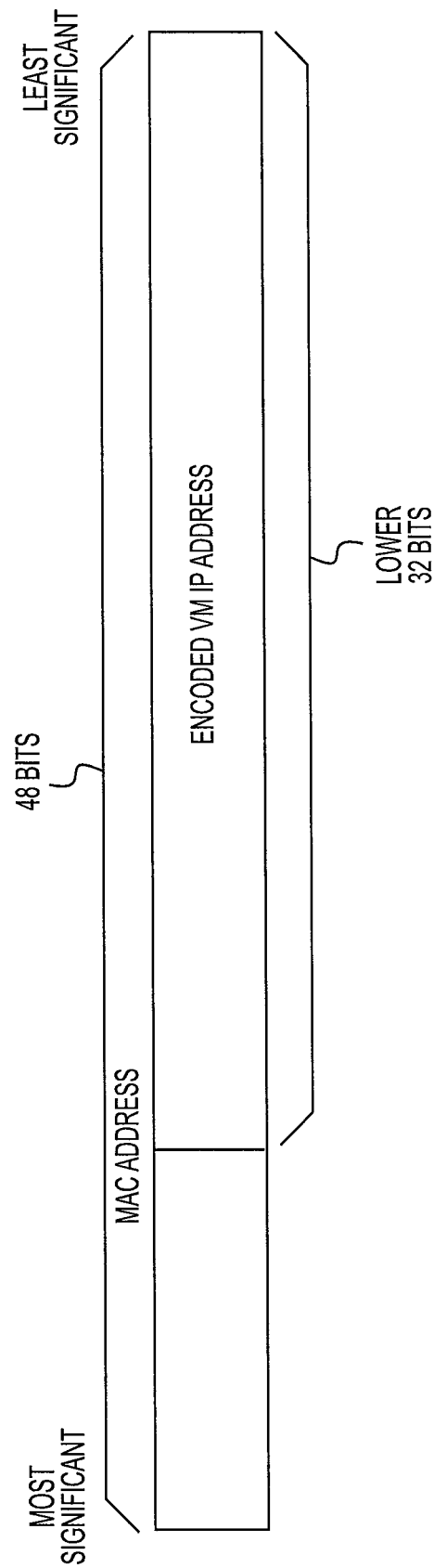
FIG. 16 shows the structure of an encoded MAC address according to an embodiment of the present invention.

As shown in FIG. 16, a MAC address for a virtual machine is 48 bits and an IP address for the virtual machine is encoded in least significant, lower 32 bits of the MAC address. As such, when the hypervisor refers to the virtual machine configuration information 331 when configuring the virtual machine 310 and determining the MAC address of the virtual machine 310, the IP address of the virtual machine 310 will also be specified at the same time. For example, if the assigned MAC address is "00:00:C0:A8:0A:05", the hexadecimal IPv4 address will be encoded therein as "C0:A8:0A:05" and the decimal equivalent being "192.168.10.5".

Figure 17:
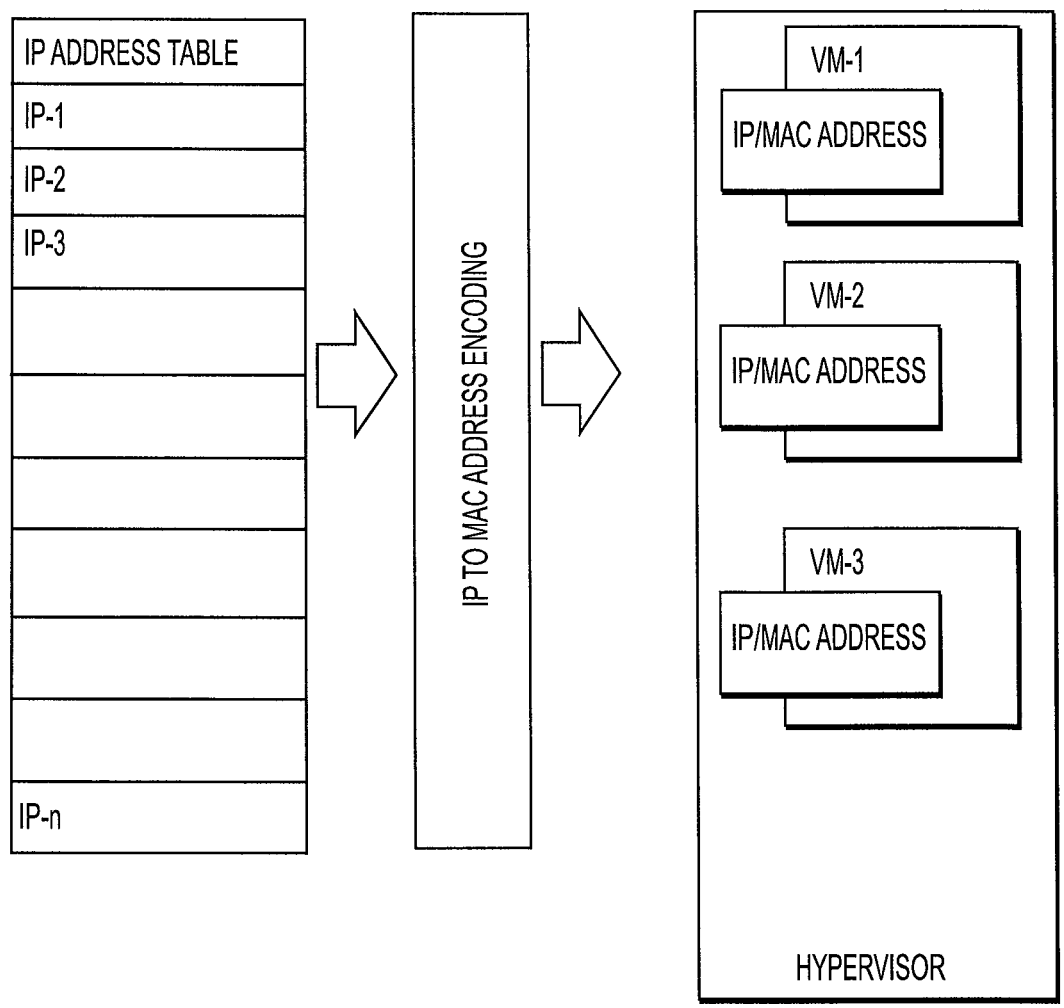
FIG. 17 is an IP address encoding diagram according to an embodiment of the present invention.
Figure 18:
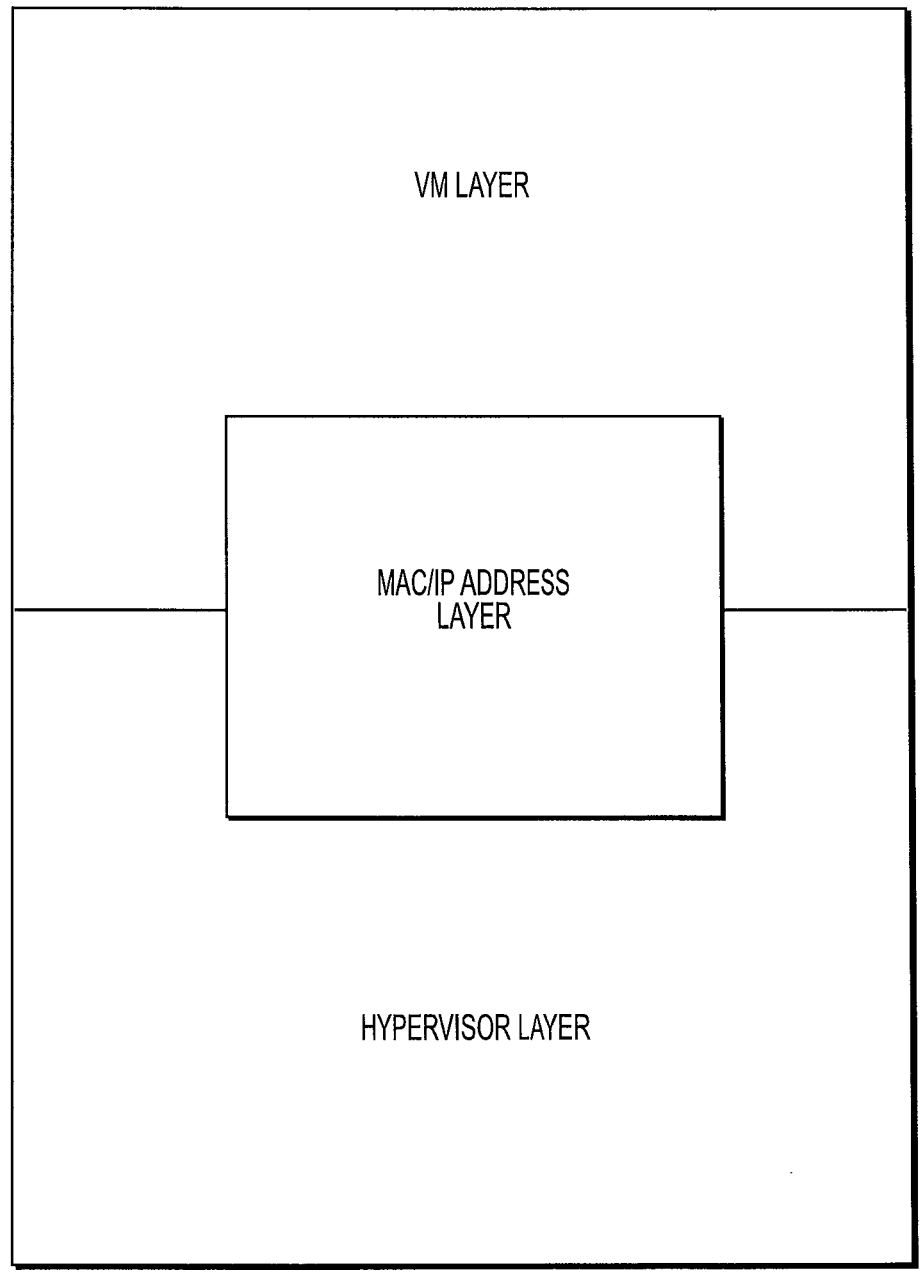
FIG. 18 is an abstract block diagram of a hypervisor layer, MAC/IP layer and virtual machine layer according to an embodiment of the present invention.

If an IP address table is specified to a node prior to the node hosting one or more virtual machines, the IP addresses in the IP address table (e.g., stored in the memory 33 of the node) can be encoded into MAC addresses as explained above and stored in the virtual machine configuration information 331. Thus, when virtual machines 310 are subsequently configured, the IP addresses thereof are passed from the node directly to the virtual machines using the encoded MAC addresses as a conduit through the hypervisor as shown in FIG. 17. Accordingly, the MAC addresses and IP addresses encoded therein can be passed from the hypervisor layer to the virtual machines 310 as shown in FIG. 18.

Figure 19:
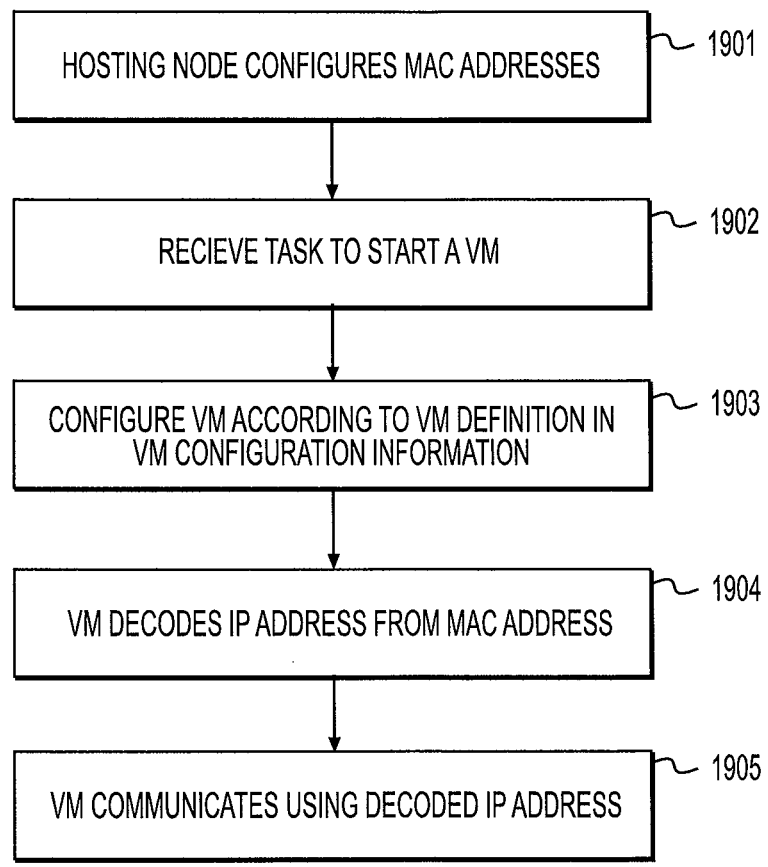
FIG. 19 is a configuration process according to an embodiment of the present invention.

FIG. 19 shows a configuration process according to one embodiment of the present invention. At step 1901, IP addresses which are allocated in the cluster 100 for assignment to virtual machines 310 are encoded into MAC addresses and stored in the virtual machine configuration information 331 on one or more nodes which will be hosting the virtual machines 310. At step 1902, a respective one of the nodes receives a task instructing the node to start a virtual machine. After receiving the task to start a virtual machine, the node configures a virtual machine 310 according to the virtual machine configuration information 331 which includes MAC addresses encoded with IP addresses assigned for use by virtual machines at step 1903. For example, in one embodiment of the present invention, the virtual machine configuration information 331 includes a plurality of .xml files which each define a virtual machine instance. In each .xml file, as part of the respective virtual machine definition is a MAC address encoded with an IP address suitable for use on the network (e.g., configured to avoid address conflicts in the network). At step 1904, the configured virtual machine decodes an IP address from the encoded MAC address provided to it by the hypervisor 305. At step 1905, the virtual machine 310 begins to communicate over the network 180 using the decoded IP address. For example, the virtual machine 310 can start launching tasks on other nodes in the cluster according to other embodiments of the present invention. Accordingly, by repeating the process shown in FIG. 19, a plurality of virtual machines can be configured on a node using IP addresses which have been predefined for the network 180 beforehand.

In-Band Data Location

According to various embodiments of the cluster 100 shown in FIG. 1, a file system is provided which spans the cluster and is not physically tied to a particular node or subset of nodes within the cluster. In other embodiments, the file system may be provided to span a subset of nodes within the cluster. In still other embodiments, plural file systems may be provided in the cluster which either span the cluster or a subset of nodes thereof. Accordingly, in such configurations, the cluster is able to be scaled in several dimensions.

Figure 20:
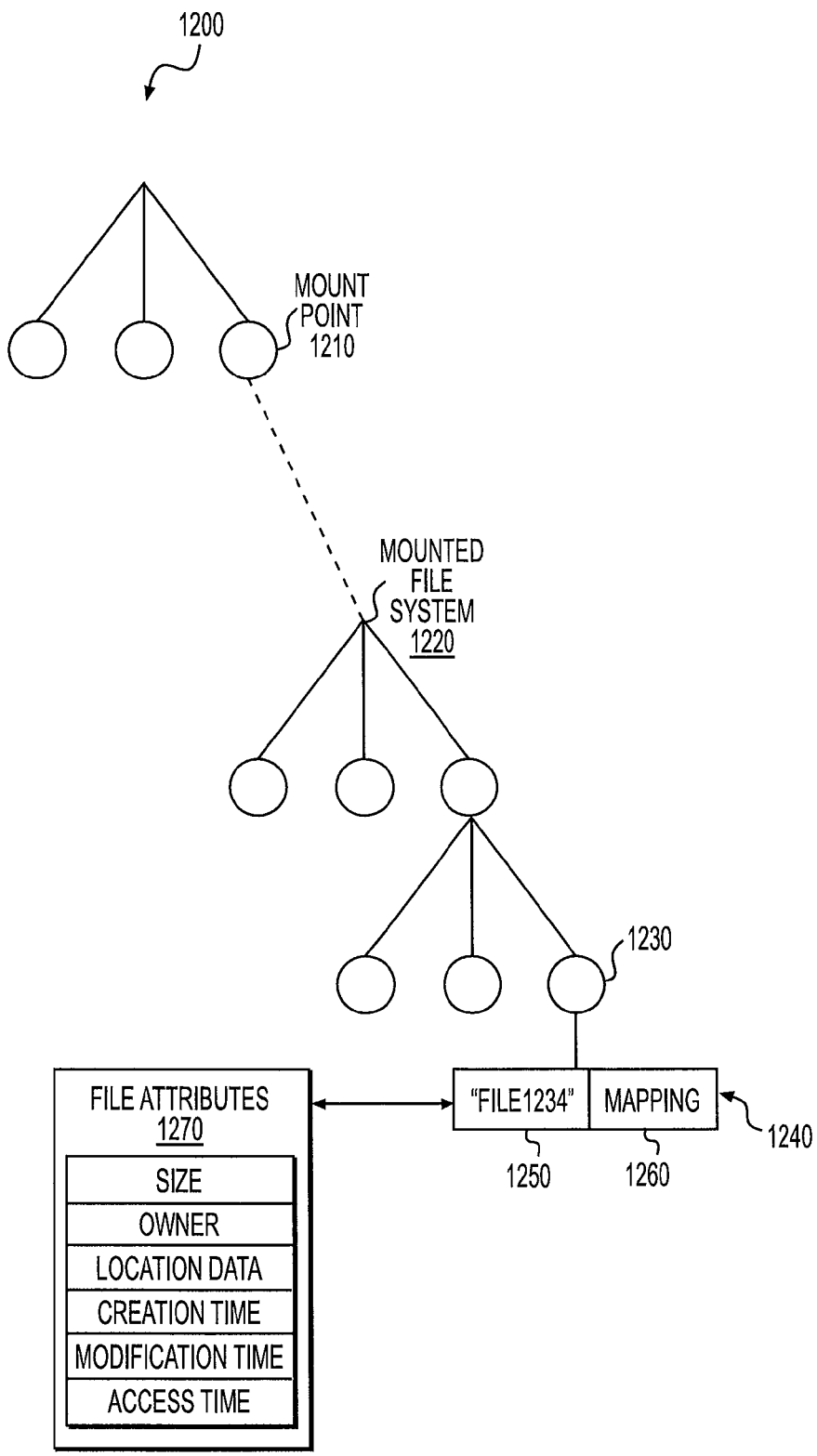
FIG. 20 is a block diagram of a file system according to an embodiment of the present invention.

In such embodiments of the present invention, the file system namespace is extended for every file to include a ".mapping" or other such extension to every file in the file system. FIG. 20 is a block diagram illustrating a file system and file attributes according to one embodiment of the present invention. In a file system 1200 provided across the cluster, a mount point 1210 provides access to a mounted file system 1220 including one or more directories. A sub-directory 1230 includes a file 1250 named "FILE1234" with a file extension corresponding to its file type such as .txt, .mp3, and the like. The file 1250 in the file system 1200 also has a corresponding ".mapping" extension file 1260 which forms a file pair 1240. The file 1250 also has associated metadata 1270. In this example, the metadata includes file attributes 1270 such as a size, an owner identifier, location data, creation time, modification time, and access time. In particular, the location data is arranged in the mapping file 1260 having the ".mapping" extension as follows.

Figure 21:
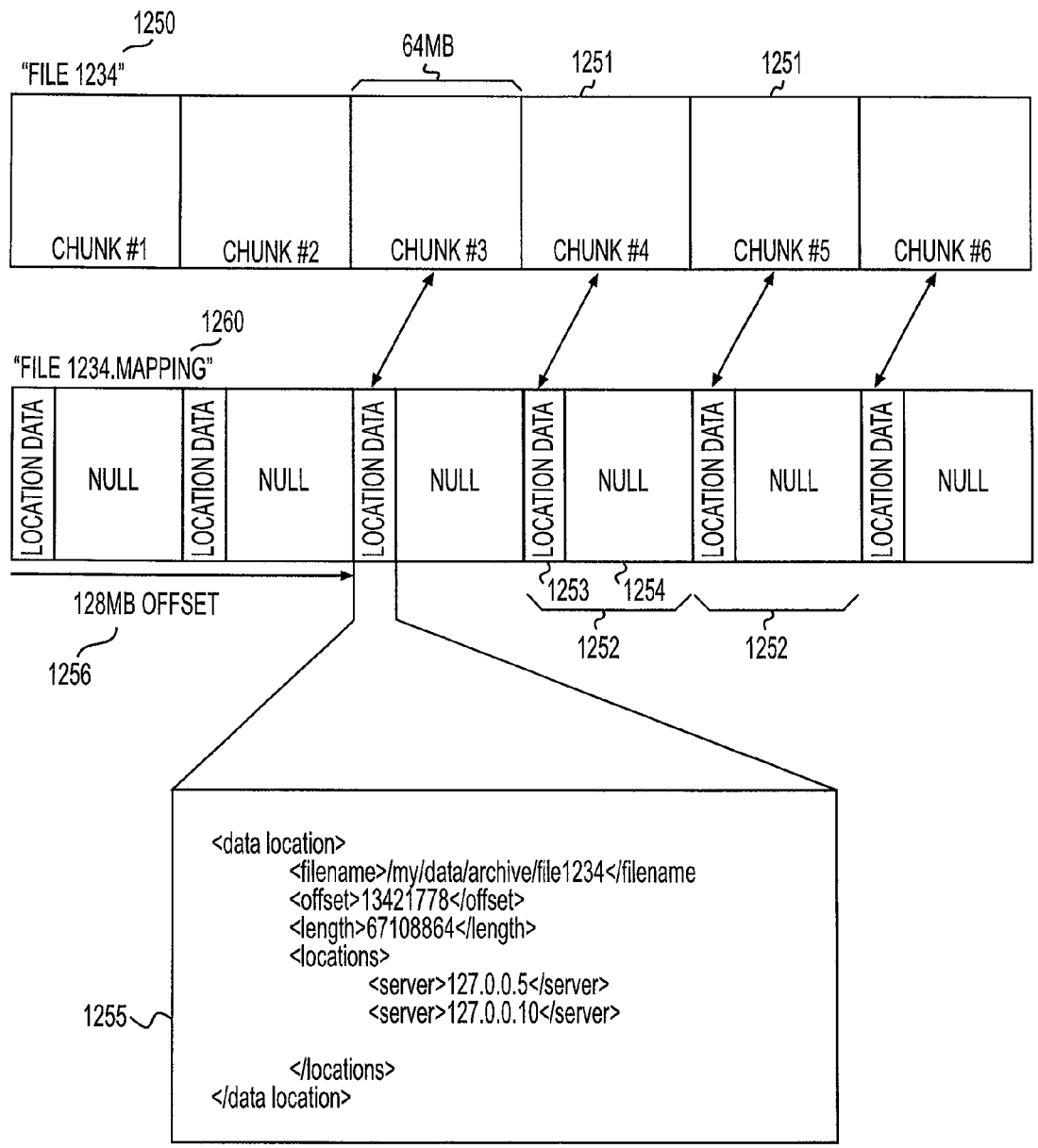
FIG. 21 is a diagram of a file, mapping file and location response according to an embodiment of the present invention.

FIG. 21 shows the structure of the file 1250 (e.g., "FILE1234.***") and of the mapping file 1260 (e.g., "FILE1234.mapping") as they relate to each other. As the file system 1200 is provided across the cluster, the file 1250 stored in the subdirectory 1230 is stored across multiple nodes in sections of data as "chunks" which are 64 MB in size. In various embodiments of the invention, a node in the cluster 100 will store a chunk (e.g., chunk #1) while another node will store a different chunk (e.g., chunk #2) and so forth as in FIG. 21 for each chunk of the file 1250. As each node is known within the cluster 100 according to a UUID, in some embodiments, the storage location of each chunk will be different. Since the file system extends across the cluster, the storage locations of the chunks may reside at different nodes in the cluster.

Figures 22, 23:
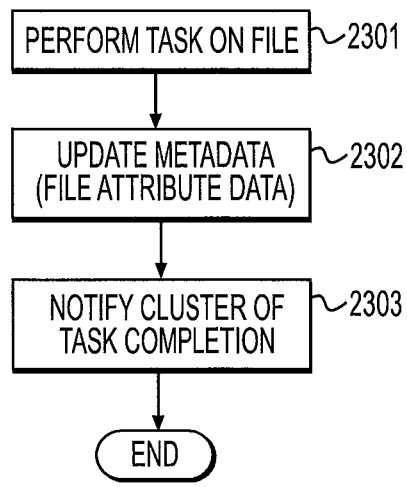
FIG. 22 shows the relationship between a file and a mapping file according to an embodiment of the present invention.
FIG. 23 is a process flow for updating file attributes and metadata according to an embodiment of the present invention.

In FIG. 21, the mapping file 1260 is differentiated from the file 1250 by the ".mapping" extension. However, any available file extension may be used for the mapping file. For example, FIG. 22 shows another alternative embodiment where the file 1250 has a path name "/my/data/archive/file1234" and the mapping file 1260 has a path name of "my/data/archive/file1234::LOCATION". According to the embodiment shown in FIG. 22, the mapping file 1260 can be accessed by using a standard file protocol specifying the path name of the mapping file.

The name space of the file system 1200 or alternatively of file system 1220 is extended to accommodate a mapping file 1260 for each file stored thereon. As shown in FIG. 21, each chunk 1251 of file 1250 has a corresponding chunk 1252 in mapping file 1260. Each chunk 1252 in the mapping file 1260 is a highly sparse chunk which stores the location data of the chunk 1251 with which it is associated. Thus, the first chunk 1252 of data in the mapping file 1260 contains location data 1253 specifying one or more nodes which store the first chunk 1251 of the file 1250, the second chunk 1252 of data in the mapping file 1260 contains location data 1253 specifying the node(s) which store the second chunk 1251 of the file 1250, and so forth as in FIG. 21. Each chunk 1252 is an area of highly sparse data consisting of the location data 1253 and an empty area 1254. For example, in the embodiment shown in FIG. 21, the empty area 1254 is indicated as "null".

Further, FIG. 23 shows a process flow where the file attributes 1270 are updated for a file 1250. At step 2301, a task is performed on a file 1250 stored in the cluster. Once the task is performed, the file attributes 1270 of the file 1250 are updated to reflect any changes the execution of the task has on the file 1250 at step 2302. For example, the task may result in the size of the file 1250 changing and the change should be reflected in the file attributes 1270 by updating the size information therein. At step 2303, after the file attributes 1270 have been updated, the cluster is notified of the completion of the task.

By structuring the file system to extend the namespace thereof so that each file 1250 has a corresponding mapping file 1260, a client 110 is able to access the mapping file using the same protocol as used to normally access files 1250 stored on the file system of the cluster. With reference to FIG. 21, if the client accesses files 1250 stored in the cluster using a remote file protocol, such as NFS (e.g., NFS v3.1), the client is also able to access the mapping files 1260 using the remote file protocol as well. In other words, the client is able to use "in-band" communications to access the mapping files 1260 of the file system without having to use a protocol or technique different from the remote file protocol used to access the files 1250 (e.g., "out-of-band). As such, the client is able to use the same mechanism to access the location information as would be used to access the data itself.

Figure 24:
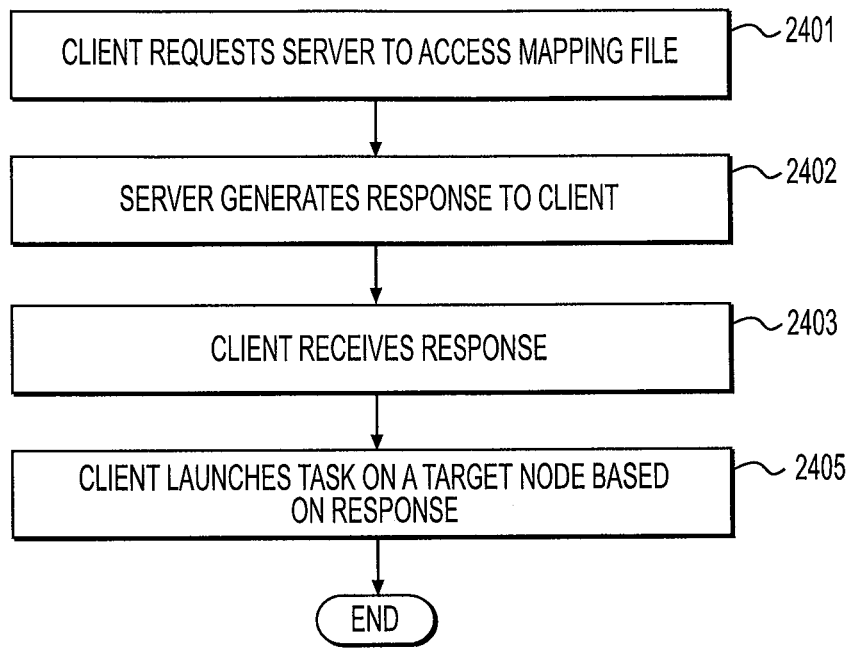
FIG. 24 is a process flow of a client access to a mapping file according to an embodiment of the present invention.

FIG. 24 shows a process flow of a client accessing the mapping file 1260 according to various embodiments of the present invention. For example, if the client wants to determine the location(s) of the third chunk 1251 of the file 1250 in the cluster 100, the client would open the mapping file 1260 and seek to an offset 1256, as in step 2401. According to the embodiment in FIG. 21, each chunk 1251 is 64 MB in size and the client would specify a seek of 128 MB in the mapping file 1260 to retrieve the location data 1253 corresponding to the third chunk 1251 of the file 1250. The location data may be, for example, a 1K block of data. In such a case, a node receiving a file access request and a seek would access the mapping file 1260, seek to the specified offset and read a segment of data 1K in size which is the location data 1253 of the chunk corresponding to the specified offset.

According to various embodiments of the present invention, a node receiving an access to a mapping file 1260 and a specified offset 1256 from a client would generate a response, as in step 2402, containing the location data 1253 which specifies the locations in the cluster where the corresponding chunk 1251 of the file 1250 is stored. In the embodiment shown in FIG. 21, a node generates a response 1255 from the location data 1253 of the mapping file 1260. As shown in FIG. 21, the response 1255 is structured as an .xml file which includes the file name (e.g., the path in the file system) of the file 1250, the offset of the chunk 1251 of the file 1250, the length of the chunk 1251, and the location(s) of node(s) which physically store the specified data. In FIG. 21, the locations are specified by IP addresses of the servers which store the specified chunk.

A client communicating with the cluster 100 receives the response 1255 at step 2403 and is able to send tasks associated with the chunk 1251 stored thereon directly to the nodes specified in the response 1255 as in step 2405. As such, the client is able to instruct the nodes in the response 1255 to perform tasks with the chunk 1251. By allowing the client to access data location information using in-band communications, tasks can be launched directly on the node which stores the data locally instead of causing one or more intermediary nodes to act as a proxy for launching the tasks on the behalf of the client. As a result, the load on the network connecting the cluster can be reduced and the relatively larger bandwidth available between each node and its local storage area can be leveraged so that tasks are performed on locally stored data instead of using proxies to operate on data remote from a given node.

In the foregoing description relating to in-band data location, embodiments have been described where location data is stored in the mapping file 1260. According to other embodiments of the present invention, other metadata pertaining to a file 1250 can be stored in the mapping file 1260 in place of or in combination with the location data. As shown in FIG. 20, file attributes 1270 of the file 1250 are maintained. Thus, other file attributes 1270 such as a size, an owner identifier, creation time, modification time, and access time can be stored in the mapping file 1260 with or in place of the location data 1253. In addition, the embodiment shown in FIG. 21 generates an .xml response 1255. However, the response 1255 can be structured in other ways than an .xml response such as by using JavaScript Object Notation (JSON), custom key-value encoding and the like.

Figure 25:
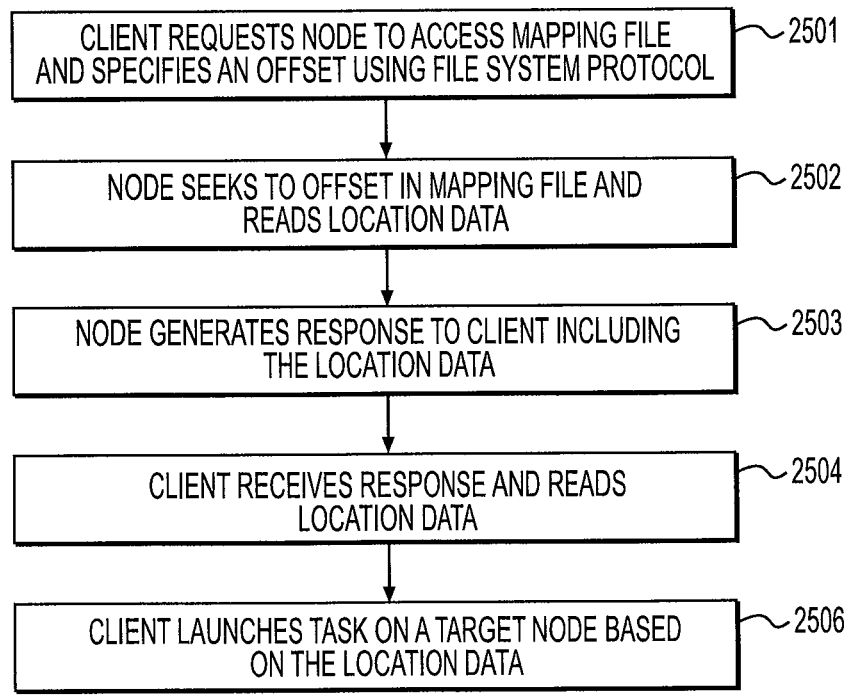
FIG. 25 is a more detailed process flow of a client access to a mapping file according to an embodiment of the present invention.

According to various embodiments of the present invention, a process flow shown in FIG. 25 is followed to determine a specific data location(s) in the cluster and instruct a task to be launched at the specific data location on the specific data. At step 2501, a client requests a node in the cluster to access a mapping file 1260 corresponding to a particular file 1250 and the client specifies an offset using a remote file protocol used to access the particular file 1250. While FIG. 25 shows that a client requests a node to access a mapping file 1260, in alternative embodiments, a node could refer to the mapping file without direction from a client in order to launch a task at another node in the cluster. At step 2502, the node receives the request and seeks to the specified offset in the mapping file 1260 and reads the location data 1253 from the mapping file 1260. A response 1255 is generated by the node which includes the location data and/or other metadata associated therewith, and the node transmits the response to the client at step 2503. Receiving the response 1255 at step 2504, the client reads the location data. According to the location data 1253, the client then is able to launch a task on a target node associated with the location data 1253 included in the response 1255 at step 2506. For example, the task launched on the target node in step 2506 may trigger the process flow for executing a received task as shown in FIG. 14.

It will be appreciated that the embodiments described herein may be implemented, for example, via computer-executable instructions or code, such as programs, stored on one or more computer-readable storage device and executed by a computing device. Such storage devices exclude signals per se. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms, storage device, "computer", and "computing device" as used herein include any device that electronically executes one or more programs, including two or more such devices acting in concert.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof.

What is claimed is:

1. A non-transitory computer readable medium with executable instructions stored thereon which, when executed by a first node of a storage system including a file system across a plurality of nodes including the first node, program the first node to execute operations comprising:

storing, by the first node, a mapping file including location information indicative of data locations of a plurality of parts of a file in the file system, wherein each of a plurality of parts of the mapping file respectively includes location data corresponding to a respective part of the file in the file system, and the location data of the plurality of parts of the mapping file is stored in the mapping file with interspersed null areas;

based, at least in part, on receiving a request from a client to retrieve location data corresponding to a certain part of the file, accessing the mapping file, by the first node, to obtain a data location of the certain part of the file based at least in part on the location information; and sending, by the first node, a response to the client that contains the location data, wherein:

the location data indicates one or more second nodes that store the certain part of the file; and the request and the response use a protocol used for accessing files in the file system.

2. The non-transitory computer readable medium according to claim 1, wherein:

the protocol used for accessing files in the file system is a file system protocol that enables the client to access data location information using the protocol used for accessing files in the file system.

3. The non-transitory computer readable medium according to claim 1, wherein:

the location data of each part of the mapping file specifies a corresponding data location where a corresponding one of the plurality of parts of the file is stored among the plurality of nodes; and/or the mapping file is an extension of the file in the file system.

4. The non-transitory computer readable medium according to claim 1, wherein:

a plurality of portions of metadata are stored with the location data of the plurality of parts of the mapping file.

5. The non-transitory computer readable medium according to claim 4, wherein:

a respective portion of metadata in the mapping file specifies information of a corresponding one of the plurality of parts of the file.

6. The non-transitory computer readable medium according to claim 1, the operations further comprising:

accessing the mapping file based on an offset of the mapping file specified in the request; and reading the location data at the specified offset of the mapping file.

7. The non-transitory computer readable medium according to claim 6, the operations further comprising:

launching a task at one of the second nodes storing the part of the file specified by the location data read at the specified offset of the mapping file.

8. The non-transitory computer readable medium according to claim 6, wherein:

the offset is related to a number of the parts of the mapping file.

9. The non-transitory computer readable medium according to claim 1, wherein:

the file system is a Network File System (NFS), and the protocol used for accessing files in the file system is a Network File System (NFS) protocol.

10. The non-transitory computer readable medium according to claim 1, wherein:

the response is configured in an extensible markup language (XML) file format; and/or the location data included in the response includes an offset and a length of the certain part of the file as stored at the one or more second nodes.

11. A method comprising:

storing, by a first node in a storage system including a file system across a plurality of nodes including the first node, a mapping file including location information indicative of data locations of a plurality of parts of a file in the file system, wherein each of a plurality of parts of the mapping file respectively includes location data corresponding to a respective part of the file in the file system, and the location data of the plurality of parts of the mapping file is stored in the mapping file with interspersed null areas;

based, at least in part, on receiving a request from a client to retrieve location data corresponding to a certain part of the file, accessing the mapping file, by the first node, to obtain a data location of the certain part of the file based at least in part on the location information; and sending, by the first node, a response to the client that contains the location data, wherein:

the location data indicates one or more second nodes that store the certain part of the file, and the request and the response use a protocol used for accessing files in the file system.

12. The method according to claim 11, wherein:

the protocol used for accessing files in the file system is a file system protocol that enables the client to access data location information using the protocol used for accessing files in the file system.

13. The method according to claim 11, wherein:

the location data of each part of the mapping file specifies a corresponding data location where a corresponding one of the plurality of parts of the file is stored among the plurality of nodes; and/or the mapping file is an extension of the file in the file system.

14. The method according to claim 11, further comprising:

accessing the mapping file based on an offset of the mapping file specified in the request; and reading the location data at the specified offset of the mapping file.

15. A node in a storage system including a file system across a plurality of nodes including the node, the node comprising one or more processors, wherein the one or more processors are programmed to:

store a mapping file including location information indicative of data locations of a plurality of parts of a file in the file system, wherein: each of a plurality of parts of the mapping file respectively includes location data corresponding to a respective part of the file in the file system, and the location data of the plurality of parts of the mapping file is stored in the mapping file with interspersed null areas;

based, at least in part, on receiving a request from a client to retrieve location data corresponding to a certain part of the file, access the mapping file to obtain a data location of the certain part of the file based at least in part on the location information; and send a response to the client that contains the location data, wherein:

the location data indicates one or more other nodes that store the certain part of the file; and the request and the response use a protocol used for accessing files in the file system.

16. The node according to claim 15, wherein:

the protocol used for accessing files in the file system is a file system protocol that enables the client to access data location information using the protocol used for accessing files in the file system.

17. The node according to claim 15, wherein:
the location data of each part of the mapping file specifies a corresponding data location where a corresponding one of the plurality of parts of the file is stored among the plurality of nodes; and/or
the mapping file is an extension of the file in the file system.

18. The node according to claim 15, wherein:
a plurality of portions of metadata are stored with the location data of the plurality of parts of the mapping file; and
a respective portion of metadata in the mapping file specifies information of a corresponding one of the plurality of parts of the file.

19. The node according to claim 15, wherein the one or more processors are further programmed to:
access the mapping file based on an offset of the mapping file specified in the request; and
read the location data at the specified offset of the mapping file.

20. The node according to claim 15, wherein:
the response is configured in an extensible markup language (XML) file format; and/or
the location data included in the response includes an offset and a length of the certain part of the file as stored at the one or more second nodes.

21. A storage system including a plurality of nodes, each node comprising at least one processor, respectively, with a file system across the plurality of nodes, the plurality of nodes including a first node, wherein the first node is configured to:
store, by the first node, a mapping file including location information indicative of data locations of a plurality of parts of a file in the file system, wherein each of a plurality of parts of the mapping file respectively includes location data corresponding to a respective part of the file in the file system, and the location data of the plurality of parts of the mapping file is stored in the mapping file with interspersed null areas;
based, at least in part, on receiving a request from a client to retrieve location data corresponding to a certain part of the file, access the mapping file, by the first node, to obtain a data location of the certain part of the file based at least in part on the location information; and
send, by the first node, a response to the client that contains the location data, wherein:
the location data indicates one or more second nodes that store the certain part of the file; and
the request and the response use a protocol used for accessing files in the file system.

22. The storage system according to claim 21, wherein:
the protocol used for accessing files in the file system is a file system protocol that enables the client to access data location information using the protocol used for accessing files in the file system.

23. The storage system according to claim 21, wherein:
the location data of each part of the mapping file specifies a corresponding data location where a corresponding one of the plurality of parts of the file is stored among the plurality of nodes; and/or
the mapping file is an extension of the file in the file system.

24. The storage system according to claim 21, wherein:
a plurality of portions of metadata are stored with the location data of the plurality of parts of the mapping file; and
a respective portion of metadata in the mapping file specifies information of a corresponding one of the plurality of parts of the file.

25. The storage system according to claim 21, wherein the storage system is further configured to:
access the mapping file based on an offset of the mapping file specified in the request; and
read the location data at the specified offset of the mapping file.

26. The storage system according to claim 21, wherein:
the response is configured in an extensible markup language (XML) file format; and/or
the location data included in the response includes an offset and a length of the certain part of the file as stored at the one or more second nodes.

\* \* \* \* \*